US010960315B1

(12) United States Patent
Hunter et al.

(10) Patent No.: US 10,960,315 B1
(45) Date of Patent: Mar. 30, 2021

(54) MAPPING IDENTIFIER VALUES OF A GAMEPLAY SESSION FOR APPLICATION PROFILING

(71) Applicant: Electronic Arts Inc., Redwood City, CA (US)

(72) Inventors: Newman Scott Hunter, Vancouver (CA); Tomas Ramos, Vancouver (CA); David Michael King, Stockholm (SE)

(73) Assignee: Electronic Arts Inc., Redwood City, CA (US)

( * ) Notice: Subject to any disclaimer, the term of this patent is extended or adjusted under 35 U.S.C. 154(b) by 87 days.

(21) Appl. No.: 16/207,488

(22) Filed: Dec. 3, 2018

(51) Int. Cl.
*A63F 13/86* (2014.01)
*A63F 13/77* (2014.01)

(52) U.S. Cl.
CPC .................................... *A63F 13/77* (2014.09)

(58) Field of Classification Search
CPC ........ A63F 13/35; A63F 13/497; A63F 13/77; A63F 13/79; A63F 13/86; A63F 2300/535
USPC ........................................................ 463/43
See application file for complete search history.

(56) References Cited

U.S. PATENT DOCUMENTS

| 10,589,172 | B1* | 3/2020 | Nash | A63F 13/25 |
| 2013/0244789 | A1* | 9/2013 | Gary | A63F 13/86 463/43 |
| 2014/0228112 | A1* | 8/2014 | Laakkonen | A63F 13/35 463/31 |
| 2015/0321098 | A1* | 11/2015 | van der Laan | H04L 67/38 463/31 |
| 2017/0113143 | A1* | 4/2017 | Marr | A63F 13/355 |
| 2017/0266568 | A1* | 9/2017 | Lucas | A63F 13/77 |
| 2018/0111051 | A1* | 4/2018 | Xue | A63F 13/35 |
| 2018/0126277 | A1* | 5/2018 | Yan | A63F 13/35 |
| 2019/0373040 | A1* | 12/2019 | Grubbs | H04L 65/608 |

* cited by examiner

Primary Examiner — Michael A Cuff
(74) Attorney, Agent, or Firm — McDermott Will & Emery LLP

(57) ABSTRACT

A computing system may determine values associated with a plurality of identifiers that are associated with a gameplay session of a video gaming application. The computing system may determine a mapping of the values associated with the plurality of identifiers, including associating, for each identifier, each value associated with the respective identifier during a time period of the gameplay session with values that are associated with a respective one or more other identifiers from the plurality of identifiers during at least a portion of the time period of the gameplay session. The computing system may, in response to receiving a query that indicates a value associated with an identifier from the plurality of identifiers, providing values associated with one or more identifiers that are associated with the value associated with the identifier based at least in part on the mapping of the values associated with the plurality of identifiers.

18 Claims, 8 Drawing Sheets

MAPPING IDENTIFIER VALUES OF A GAMEPLAY SESSION FOR APPLICATION PROFILING

TECHNICAL FIELD

The present disclosure generally relates to application profiling, and more specifically relates to mapping identifier values of a gameplay session of a video gaming application for profiling the performance of the video gaming application.

BACKGROUND

During a gameplay session of a video gaming application, the video gaming application may create, send, receive, and/or otherwise encounter identifiers associated with data and other information. Such data and information may include data and information that describes the gameplay session, the video gaming application, and the computing device that executes the video gaming application. Such data and information may also include data and information on external computing systems with which the video gaming application communicates during the gameplay session. In addition, applications and services external to the video gaming application and gameplay session may generate various data and information associated with the gameplay session, such as telemetry data and profiling data.

The description provided in the background section should not be assumed to be prior art merely because it is mentioned in or associated with the background section. The background section may include information that describes one or more aspects of the subject technology.

SUMMARY

The disclosed system provides for a keychain service that creates a mapping of the values of identifiers associated with a gameplay session of a video gaming application that may be used to profile the performance of the video gaming application. At any point in a gaming session, the gaming session is associated with one or more identifiers having associated values that are indicative of various data and information associated with the gameplay session during that point in time. Such information and data may be useful during development and testing of the video gaming application to improve performance of the video gaming application and to determine the cause of bugs that cause the video gaming application to perform slowly, crash, or otherwise malfunction.

The system may track the values of a number of identifiers associated with a gameplay session. The system may map each value that is associated, for a specified period of time in the gameplay session, with an identifier with every other value tracked by the system that is associated, for at least a portion of the specified period of time, with another identifier to create a mapping of every value associated with an identifier with one or more other values associated with one or more other identifiers. Thus, a single value associated with an identifier may be used to find all other values associated with identifiers that are mapped to the single value associated with the identifier.

Because each value associated with an identifier identifies specific data or information relevant to the performance of the video gaming application at a particular period of time within a gameplay session, the system enables the use of a single value associated with an identifier during the particular period of time to identify all of the data or information that is relevant to the performance of the video gaming application at the same particular period of time. This reduces the amount of computation and the amount of extraneous communications that may be necessary to identify relevant data or information that is useful for profiling or debugging the video gaming application, thereby improving the performance of the system in profiling and/or debugging the video gaming application.

According to certain aspects of the present disclosure, a computer-implemented method for profiling runtime performance of a video gaming application is provided. The method includes receiving indications of values associated with a plurality of identifiers that are associated with a gameplay session of a video gaming application, wherein the plurality of identifiers include one or more system identifiers associated with data at one or more external systems, one or more contextual identifiers associated with context of the video gaming application, and one or more artifact identifiers associated with one or more artifacts that are generated outside of the gameplay session. The method further includes determining a mapping of the values associated with the plurality of identifiers, including associating, for each identifier from the plurality of identifiers, each value associated with the respective identifier during a time period of the gameplay session with values associated with a respective one or more other identifiers from the plurality of identifiers during at least a portion of the time period of the gameplay session. The method further includes in response to receiving a query that indicates a value associated with an identifier from the plurality of identifiers, providing values associated with one or more identifiers that are associated with the value associated with the identifier based at least in part on the mapping of the values associated with the plurality of identifiers.

According to certain aspects of the present disclosure, a system for profiling runtime performance of a video gaming application is provided. The system includes a memory storing instructions. The system further includes a processor configured to execute the instructions. The instructions, when executed, cause the processor to receive indications of values associated with a plurality of identifiers that are associated with a gameplay session of a video gaming application, wherein the plurality of identifiers include one or more system identifiers associated with data at one or more external systems, one or more contextual identifiers associated with context of the video gaming application, and one or more artifact identifiers associated with one or more artifacts that are generated outside of the gameplay session. The instructions, when executed, further cause the processor to determine a mapping of the values associated with the plurality of identifiers, including associating, for each identifier from the plurality of identifiers, each value associated with the respective identifier during a time period of the gameplay session with values that are associated with a respective one or more other identifiers from the plurality of identifiers during at least a portion of the time period of the gameplay session. The instructions, when executed, further cause the processor to store the mapping of the values associated with the plurality of identifiers in the memory. The instructions, when executed, further cause the processor to, in response to receiving a query that indicates a value associated with an identifier from the plurality of identifiers, provide values associated with one or more identifiers that are associated with the value associated with the identifier based at least in part on the mapping of the values associated with the plurality of identifiers.

According to certain aspects of the present disclosure, a non-transitory machine-readable storage medium comprising machine-readable instructions for causing a processor to execute a method for profiling runtime performance of a video gaming application is provided. The method includes receiving indications of values associated with a plurality of identifiers that are associated with a gameplay session of a video gaming application, wherein the plurality of identifiers include one or more system identifiers associated with data at one or more external systems, one or more contextual identifiers associated with context of the video gaming application, and one or more artifact identifiers associated with one or more artifacts that are generated outside of the gameplay session. The method further includes determining a mapping of the values associated with the plurality of identifiers, including associating, for each identifier from the plurality of identifiers, each value associated with the respective identifier during a time period of the gameplay session with values associated with a respective one or more other identifiers from the plurality of identifiers during at least a portion of the time period of the gameplay session. The method further includes in response to receiving a query that indicates a value associated with an identifier from the plurality of identifiers, providing values associated with one or more identifiers that are associated with the value associated with the identifier based at least in part on the mapping of the values associated with the plurality of identifiers.

According to certain aspects of the present disclosure, an apparatus for profiling runtime performance of a video gaming application is provided. The apparatus includes means for receiving indications of values associated with a plurality of identifiers that are associated with a gameplay session of a video gaming application, wherein the plurality of identifiers include one or more system identifiers associated with data at one or more external systems, one or more contextual identifiers associated with context of the video gaming application, and one or more artifact identifiers associated with one or more artifacts that are generated outside of the gameplay session. The apparatus further includes means for determining a mapping of the values associated with the plurality of identifiers, including associating, for each identifier from the plurality of identifiers, each value associated with the respective identifier during a time period of the gameplay session with values associated with a respective one or more other identifiers from the plurality of identifiers during at least a portion of the time period of the gameplay session. The apparatus further includes means for, in response to receiving a query that indicates a value associated with an identifier from the plurality of identifiers, providing values associated with one or more identifiers that are associated with the value associated with the identifier based at least in part on the mapping of the values associated with the plurality of identifiers.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

Figure 1:
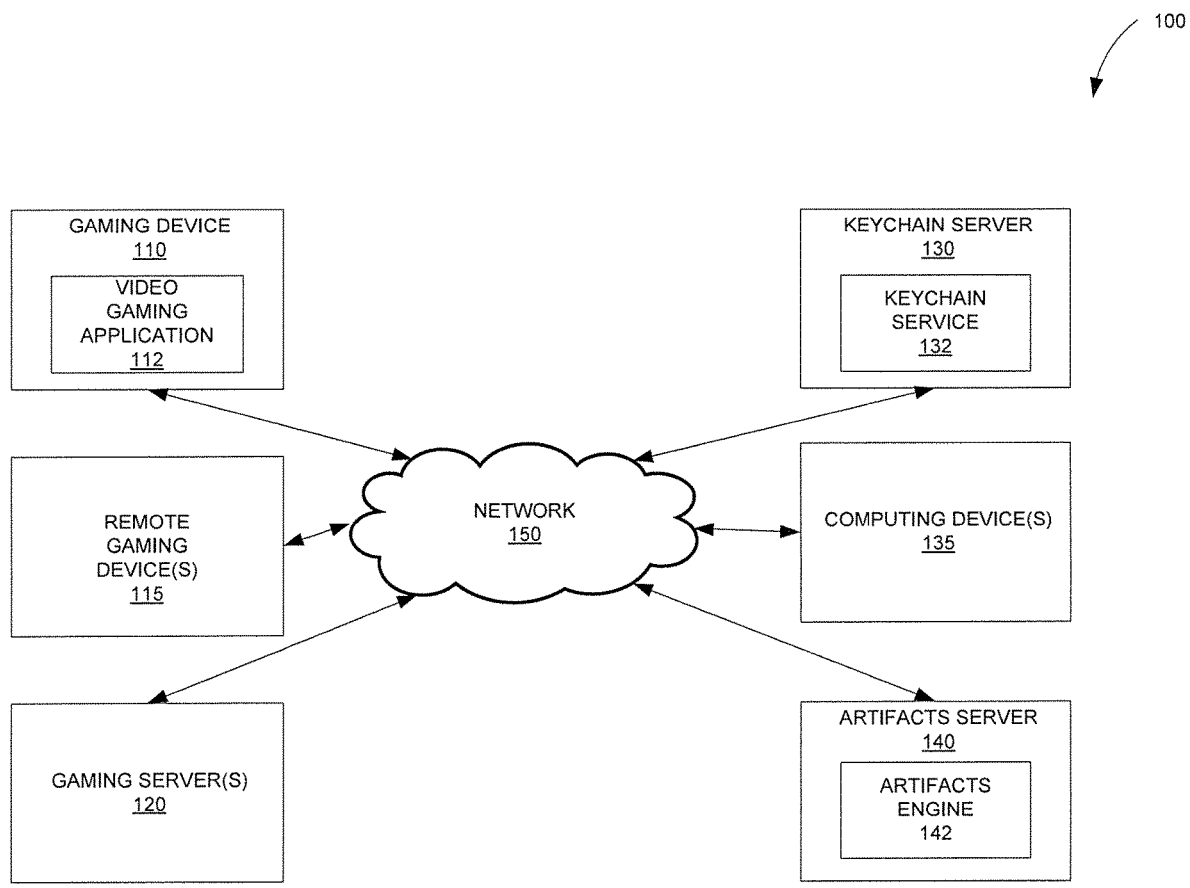
FIG. 1 illustrates an example architecture for profiling runtime performance of a gaming application, according to certain aspects of the disclosure.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

General Overview

The disclosed system provides for a keychain service that creates a mapping of the values of identifiers associated with a gameplay session of a video gaming application that may be used to profile the performance of the video gaming application.

The disclosed system utilizes values of identifiers associated with the gameplay session of the video gaming application to identify data and information associated with the gameplay session. The disclosed system associates identifier values such that the disclosed system may, in response to receiving a query for a value that is associated with an identifier during a specific time period of the gameplay session, return all values that are associated with identifiers during at least a portion of the specified time period.

Because each value associated with an identifier identifies data and information associated with the gameplay session for the time period in which the value is associated with the identifier, the disclosed system enables the use of a single query to identify a wide variety of information relevant to the time period of the gameplay session, which may be used to perform profiling and debugging of the video gaming application. This is in contrast to techniques that include making multiple queries to a wide variety of servers and devices in order to identify and retrieve information that is relevant to a specific time period of the gameplay session.

As such, the disclosed system addresses a technical problem tied to computer technology and arising in the realm of computer networks, namely the technical problem of making numerous queries and transactions in order to identify and retrieve information that is relevant to a specific time period of the gameplay session of a video gaming application for the purposes of performing profiling and debugging of the video gaming application. The disclosed system solves this technical problem by associating identifier values so that for a given time period in which a value is associated with an identifier, the value is associated with all other values tracked by the disclosed system that are also associated with identifiers during at least a portion of the given time period. This reduces the amount of computations, queries, network transactions, and the like that are needed to identify and retrieve information that is relevant to a specific time period of the gameplay session of a video gaming application for the purposes of performing profiling and debugging of the video gaming application, thereby increasing the speed of the system.

The disclosed system may also address a technical problem tied to identifying data and information stored at a variety of different servers and systems for use in profiling and debugging video gaming applications and debugging video gaming applications, which are concepts inextricably tied to computing technology. While many examples are provided herein in the context of a gameplay session of a video gaming application, the principles of the present disclosure contemplate other types of software applications as well.

Example System Architecture

FIG. 1 illustrates an example architecture 100 for illustrates an example architecture for profiling runtime performance of a gaming application, according to certain aspects of the disclosure. As shown in FIG. 1, the architecture 100 includes gaming device 110, one or more remote gaming devices 115, gaming servers 120, keychain server 130, one or more computing devices 135, and one or more artifacts servers 140 that are connected over network 150.

Examples of gaming device 110, one or more remote gaming devices 115, and one or more computing devices 125 may include any combinations of a desktop computer, a mobile computer, a laptop computer, a tablet device, a mobile phone, a mobile device, a server, a mainframe, a set-top box, a television, a wearable device (e.g., a computerized watch, computerized eyewear, computerized gloves, etc.), a personal digital assistant (PDA), a video game console, a media player, or any other devices having appropriate processor, memory, and communications capabilities.

One or more gaming servers 120, keychain server 130, and one or more artifacts servers 140 may include any device having an appropriate processor, memory, and communications capability for hosting data encoder service. Examples of one or more gaming servers 120, keychain server 130, and one or more artifacts servers 140 may include any combinations of desktop computers, laptop computers, mainframes, servers, cloud computing systems, or any other suitable computing systems. In some examples, one or more of servers 120, 130, and 140 can be a cloud computing server of an infrastructure-as-a-service (IaaS) and be able to support a platform-as-a-service (PaaS) and software-as-a-service (SaaS) services.

Network 150 may represent any public or private communications network, such as cellular, Wi-Fi, and/or other types of networks, the Internet, and/or an intranet for transmitting data between computing systems, servers, and computing devices. Network 150 may include one or more network hubs, network switches, network routers, or any other network equipment that are operably inter-coupled to provide for the exchange of information between gaming device 110, one or more remote gaming devices 115, gaming servers 120, keychain server 130, one or more computing devices 135, and one or more artifacts servers 140.

Gaming device 110 may be configured to execute video gaming application 112. During a gameplay session of video gaming application 112, video gaming application 112 may interact and exchange data with one or more gaming servers 120 and one or more remote gaming devices 115 via network 150. For example, video gaming application 112 may communicate with one or more gaming servers 120 to log onto a gaming network and to find one or more online players at one or more remote gaming devices 115 in order to start a game between the player at video gaming application 112 and the one or more online players. In other examples, video gaming application 112 may communicate with one or more gaming servers 120 via network 150 to download gaming levels, update the online scoreboard, and the like.

A gameplay session of video gaming application 112 may be a time period where video gaming application 112 executes at gaming device 110 that starts when a player (i.e., user of video gaming application 112) starts up video gaming application 112 at gaming device 110, and ends when the user exits video gaming application 112. During a gameplay session, the user may start and play one or more games. For example, the user may start and end one or more games during the gameplay session. Such games may include offline games where video gaming application 112 does not communicate with one or more remote gaming devices 115 or one or more gaming servers 120, and/or online games where the player at video gaming application 112 may play with or against online players at one or more remote gaming devices 115 that communicate with one or more gaming servers 120 via network 150.

During the gameplay session, video gaming application 112 may encounter a variety of data and information that are sent from, received by, and/or created by video gaming application 112. For example, video gaming application 112 may create and send a player identifier to log into a gaming system at one or more gaming servers 120. In another example, video gaming application 112 may create or receive a level identifier that indicates the level of the game being played during the gameplay session of video gaming application 112. The value of the level identifier may change each time a new level is reached during the gameplay session, so that each value of the level identifier is associated with each value reached during the gameplay session. In another example, in order to start an online gaming session, video gaming application 112 may send a request for, and receive, a matchmaking identifier from one or more gaming servers 120 that identifies the details of an online gaming session in which the player at video gaming application 112 is matched with a remote player at one of one or more remote gaming devices 115.

Video gaming application 112 may encounter two kinds of identifiers: system identifiers and contextual identifiers. System identifiers may be identifiers associated with data at one or more external systems (e.g., one or more gaming servers 120), while context identifiers may be identifiers associated with context of video gaming application 112. Examples of system identifiers include player identifiers, matchmaking identifiers, and the like. These identifiers may be communicated by video gaming application 112 to external systems such as one or more gaming servers 120. For example, video gaming application 112 may send a player identifier to one or more gaming servers 120 to log on to a gaming network. In another example, video gaming application 112 may receive a matchmaking identifier as part of establishing an online gaming session.

The system identifiers may be associated with values that may be used to access data and information that exist at external systems such as one or more gaming servers 120. For example, one or more gaming servers 120 may store information associated with online gaming sessions, where the information about a particular online gaming session includes an indication of the matchmaking identifier value associated with the online gaming session along with additional information regarding the online gaming session. Thus, the value associated with a matchmaking identifier may be used to retrieve additional information regarding the associated online gaming session. In this way the value associated with a matchmaking identifier is associated with data stored at an external system regarding an online gaming session.

In another example, one or more gaming servers 120 may store information associated with players that are part of a gaming network, which may be indexed based on the player identifier value associated with the player. Thus, the value associated with a player identifier may be used to retrieve additional information associated with the player from external systems, such as one or more gaming servers 120.

Examples of contextual identifiers associated with the context of video gaming application 112 may include build version identifiers associated with values that identify the build version of video gaming application 112, user name identifiers associated with values that identify the user names that were logged into video gaming application 112 during gameplay session 206, platform identifiers associated with values that identify the computing platform of gaming device 110, level identifiers associated with values that identify levels of video gaming application 112 that were played during a gameplay session, start position identifiers associated with values that identifies the start positions of the video gaming application 112 during the gameplay session, video card identifiers associated with values that identify the type of video card installed in gaming device 110, and the like.

Artifacts server 140 may be configured to execute artifacts engine 142 to generate artifacts associated with the gaming session of video gaming application 112. Artifacts associated with the gaming session of video gaming application 112 may include files and documents that are generated by artifacts engine 142 outside of the gaming session of video gaming application 112. Artifacts server 140 may execute artifacts engine 142 during a gaming session or after a gaming session in order to generate artifacts associated with the gaming session. Examples of artifacts generated by artifacts engine 142 may include telemetry data associated with the gaming session, gameplay logs associated with the gameplay session, screenshots associated with the gaming session, bug reports associated with the gaming session, and the like. Artifacts server 140 may execute artifacts engine 142 to generate artifact identifiers having values that indicate the artifacts generated by artifacts engine 142. Artifact identifiers may include bug identifiers telemetry identifiers, screenshot identifiers, and the like.

Keychain server 130 may be configured to execute keychain service 132 to receive indications of values associated with identifiers that are associated with a gameplay session of a video gaming application 112. Keychain service 132 may receive indications of values associated with one or more system identifiers and one or more contextual identifiers from video gaming application 112. Keychain service 132 may also receive indications of values associated with one or more artifact identifiers from artifacts engine 142.

Keychain service 132 may execute to determine a mapping of the values associated with the identifiers. Keychain service 132 may associate, for each identifier from the identifiers, each value associated with the respective identifier during a time period of the gameplay session with values that are associated with one or more other identifiers during at least a portion of the time period of the game play session. Thus, for each value that is associated with an identifier for a specified period of time during the gameplay session, keychain service 132 may associate the values that is associated with the identifier with other values that are also associated for at least a portion of the specified period of time, with other identifiers.

Keychain service 132 may use the mapping of the values associated with the identifiers to determine, for a value associated for a period of time with an identifier, all other associated values that are associated for at least a portion of the period of time with other identifiers. For example, if a value "M1234" is associated for a period of time during the gaming session with a matchmaking identifier, and if a value "P 1234" is associated with a player identifier for at least a portion of the same period of time during the gaming session, then keychain service 132 may be queried using the value "M1234" associated with the matchmaking identifier to return the value "P1234" associated with the player identifier.

In this way, keychain service 132 enables the use of a single value associated with an identifier to identify associated values associated with other identifiers. This enables a profiling application or a debugging application, which may execute at one or more computing devices 135, to communicate with and utilize keychain service 132 to quickly discover all of the values associated at identifiers at a particular time during the gaming session by just knowing one value associated with an identifier at the particular time during the gaming session.

Example Profiling System

Figure 2:
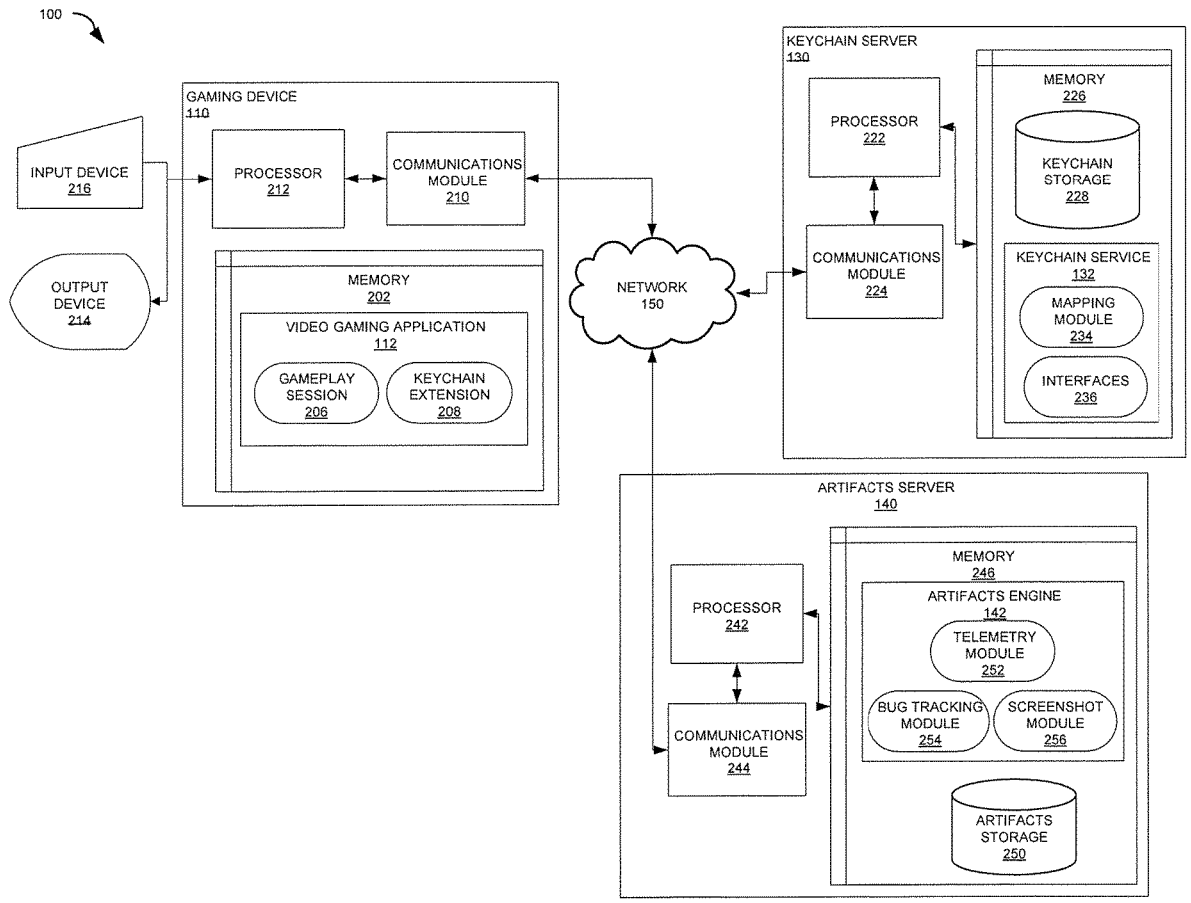
FIG. 2 is a block diagram illustrating an example gaming device, example keychain server, and example artifacts server communicating via an example network in the example architecture of FIG. 1 according to certain aspects of the disclosure.

FIG. 2 is a block diagram illustrating an example gaming device 110, example keychain server 130, and example artifacts server 140 communicating via example network 150 in the example architecture 100 of FIG. 1 according to certain aspects of the disclosure. As shown in FIG. 2, gaming device 110, keychain server 130, and artifacts server 140 may be connected over the network 150 via respective communications modules 210, 224, and 244. The communications modules 210, 224, and 244 are configured to interface with the network 150 to send and receive information, such as data, requests, responses, and commands to other devices on the network. The communications modules 210, 224, and 244 can be any suitable wired or wireless network interfaces, such as modems or Ethernet cards.

Gaming device 110 includes a processor 212, the communications module 210, and the memory 202 that includes video gaming application 112. Gaming device 110 also includes input device 216, such as a keyboard, mouse, touchscreen, joystick, steering wheel and the like, and output device 214 such as a display device. Processor 212 of gaming device 110 is configured to execute instructions, such as instructions physically coded into processor 212, instructions received from software in memory 202, or a combination of both. For example, processor 212 of gaming device 110 may receive and execute instructions of video gaming application 112 to perform the functionality of video gaming application 112. Processor 212 may execute instructions of video gaming application 112 to receive input data from input device 216 and to output data such as graphical content, audio content, and the like at output device 214.

Video gaming application 112 may be any suitable video gaming application that may be played by a user via input device 216, including but not limited to roleplaying video games, first person shooter video games, sports video games, and the like. In some examples, video gaming application 112 may be single player video games or multiplayer video games. Video gaming application 112 may be played entirely offline or may be played online by interacting with one or more gaming servers 120 via network 150. Video gaming application 112 may interact with one or more gaming servers 120 to log into a gaming network hosted on one or more gaming servers 120 and/or to match the user of video gaming application 112 with other users so that the user of video gaming application 112 may play video gaming application 112 against other users or cooperatively play video gaming application 112 with other users.

During gameplay session 206, video gaming application 112 may encounter two kinds of identifiers associated with gameplay session 206: system identifiers and contextual identifiers. System identifiers may be identifiers associated with data at one or more external systems (e.g., one or more gaming servers 120), while context identifiers may be identifiers associated with context of video gaming application 112. Examples of system identifiers include player identifiers, matchmaking identifiers, and the like. These identifiers may be communicated by video gaming application 112 to external systems such as one or more gaming servers 120. For example, video gaming application 112 may send a player identifier to one or more gaming servers 120 to log on to a gaming network. In another example, video gaming application 112 may receive a matchmaking identifier as part of establishing an online gaming session.

Examples of contextual identifiers associated with the context of video gaming application 112 may include build version identifiers associated with values that identify the build version of video gaming application 112, user name identifiers associated with values that identify the user names that were logged into video gaming application 112 during gameplay session 206, platform identifiers associated with values that identify the computing platform of gaming device 110, level identifiers associated with values that identify levels of video gaming application 112 that were played during gameplay session 206, start position identifiers associated with values that identifies the start positions of the video gaming application 112 during gameplay session 206, video card identifiers associated with values that identify the type of video card installed in gaming device 110, and the like.

Video gaming application 112 may include keychain extension 208. Keychain extension 208 may be instructions that processor 212 may receive and execute to determine values associated with identifiers that are utilized by video gaming application 112 during gameplay session 206 and to send, via communications module 210 and network 150, indications of the identifiers and the associated values that are utilized by video gaming application 112 during gameplay session 206 to keychain server 130. As gameplay session 206 progresses, video gaming application 112 may encounter identifiers and values associated with identifiers. For example, video gaming application 112 may encounter new identifiers associated with values as well as previously-encountered identifiers associated with an updated value. As video gaming application 112 encounters identifiers associated with values, keychain extension 208 may send indications of the identifiers and the associated values to keychain server 130.

Artifacts server 140 includes processor 242, communications module 244, and memory 246 that includes artifacts engine 142 and artifacts storage 250. Processor 242 of artifacts server 140 is configured to execute instructions, such as instructions physically coded into processor 242, instructions received from software in memory 246, or a combination of both. For example, processor 242 of artifacts server 140 may receive and execute instructions of artifacts engine 142 to perform the functionality of artifacts engine 142.

Artifacts engine 142 may execute at processor 242 to generate artifacts associated with gameplay session 206 of video gaming application 112 that executes at gaming device 110. Artifacts engine 142 may generate artifacts associated with gameplay session 206 of video gaming application 112 outside of gameplay session 206. In other words, artifacts engine 142 may include applications, modules, services, processes, and the like that execute separately from video gaming application 112. Such applications, modules, services, processes, and the like may execute to generate artifacts associated with gameplay session 206 during gameplay session 206 and even after gameplay session 206 has ended.

In the example of FIG. 2, artifacts engine 142 includes telemetry module 252, bug tracking module 254, and screenshot module 256. Modules 252, 254, and 256 are just some examples of applications, modules, services, processes, and the like that may execute to generate artifacts associated with gameplay session 206, and architecture 100 may include any other applications, modules, services, processes, and the like that may execute to generate artifacts associated with gameplay session 206. Further, while modules 252, 254, and 256 are named "modules" in the present disclosure, modules 252, 254, and 256 may be implemented as applications, modules, services, processes, and the like that may execute to generate artifacts associated with gameplay session 206.

Telemetry module 252 may execute at processor 242 to monitor gameplay session 206, to generate telemetry data associated with gameplay session 206 based on the monitoring of gameplay session 206, and to store the generated telemetry data in artifacts storage 250. Telemetry module 252 may execute to monitor an entire gameplay session 206 or may execute to monitor only certain portions (e.g., certain time periods) of gameplay session 206. As such telemetry data generated by telemetry module 252 may be associated with specific time periods during gameplay session 206 where telemetry module 252 monitored gameplay session 206 to generate the telemetry data. Telemetry data generated by telemetry module 252 may include performance data associated with gameplay session 206, user interaction data associated with user interactions with video gaming application 112 during gameplay session 206, gameplay logs associated with gameplay session 206, and the like. Telemetry module 252 may generate telemetry identifier values (e.g., values associated with the telemetry identifier) to identify telemetry data generated by telemetry module 252. Telemetry module 252 may execute to send telemetry identifiers and associated values to keychain service 132 so that keychain service 132 may associate the telemetry identifiers and associated values with the keychain for gameplay session 206. Because telemetry data may be associated with specific time periods within gameplay session 206, telemetry module 252 may send, along with the telemetry identifiers and associated values, indications of the time periods within gameplay session 206 that are associated with the telemetry identifiers and associated values to keychain service 132.

Bug tracking module 254 may execute at processor 242 to track bugs that occur at gameplay session 206, to generate bug reports associated with gameplay session 206, and to store the generated bug reports in artifacts storage 250. In some examples, bug tracking module 254 may be triggered by execute at processor 242 when video gaming application 112 crashes during gameplay session 206. In other examples, bug tracking module 254 may execute during gameplay session 206 to generate bug reports. Bug tracking module 254 may also be used after gameplay session 206 has ended so that a user may use bug tracking module 254 to create bug reports.

Bug reports may be associated with specific times in gameplay session 206, such as specific times in gameplay session 206 when bugs occur. For example, when bug tracking module 254 executes to generate a bug report in response to video gaming application 112 crashing during gameplay session 206, bug tracking module 254 may execute to associate the bug report with the specific time within gameplay session 206 when the crash occurred. In another example, after gameplay session 206 has ended, a developer or tester of video gaming application 112 may use development or testing tools to replay gameplay session 206 and may use bug tracking module 254 to create bug reports and associate them with specific times within gameplay session 206.

Bug tracking module 254 may generate bug identifier values (e.g., values associated with the bug identifier) to identify bug reports generated by bug tracking module 254. Bug tracking module 254 may execute to send bug identifiers and associated values to keychain service 132 so that keychain service 132 may associate the bug identifiers and associated values with the keychain for gameplay session 206. Because bug reports generated by bug tracking module 254 may be associated with specific times within gameplay session 206, bug tracking module 254 may send, along with the bug identifiers and associated values, indications of the times within gameplay session 206 that are associated with the bug identifiers and associated values to keychain service 132.

Screenshot module 256 may execute at processor 242 to capture screenshots of video frames that video gaming application 112 outputs for display at output device 214 during gameplay session 206. Video frames may be any frame of graphics data that video gaming application 112 outputs for display at output device 214 during gameplay session 206. In some examples, screenshot module 256 may execute during gameplay session 206 to take screenshots of video frames that video gaming application 112 outputs for display at output device 214 at specific times during gameplay session 206. In other examples, after gameplay session 206 has ended, a developer or tester of video gaming application 112 may use development or testing tools to replay gameplay session 206 and may use screenshot module 256 to take screenshots of video frames that video gaming application 112 outputs for display at output device 214 at specific times during the replay of gameplay session 206.

Each screenshot captured by screenshot module 256 is associated with a screenshot identifier value that is embedded within the screenshot itself. The screenshot identifier value may be visually embedded within a screenshot, such that the value of the screenshot identifier may be readily apparent via visually inspecting the screenshot. In other examples, the value of the screenshot identifier may be embedded within metadata of the screenshot.

In some examples, video gaming application 112 may embed screenshot identifier values within the video frames it outputs for display during gameplay session 206. Video gaming application 112 may generate graphical frames that visually includes an indication of the screenshot identifier value within the video frame, or may modify a video frame to include an indication of the screenshot identifier before it outputs the modified video frame for display during gameplay session 206. In these examples, screenshot module 256 may capture screenshots of video frames that are output by video gaming application 112 for display during gameplay session 206 and may save the captured screenshots in artifacts storage 250. In other examples, screenshot module 256 may capture screenshots of video frames that are output by video gaming application 112 for display during gameplay session 206, modify the captured screenshots to embed an indication of the screenshot identifier value within each of the captured screenshots, and save the modified screenshots in artifacts storage 250.

Each screenshot is associated with a specific time within gameplay session 206 corresponding to when the screenshot was taken during gameplay session 206. Because screenshots saved to artifacts storage 250 already includes an indication of the screenshot identifier value within each of the screenshots, screenshot module 256 may execute to send screenshots that it has captured to keychain service 132 along with the specific times within gameplay session 206 that corresponds to when each of the screenshots was taken.

As such, artifacts engine 142 executes at processor 242 to generate artifacts associated with gameplay session 206 of video gaming application 112, and to store the generated artifacts in artifacts storage 250. Artifacts generated by artifacts engine 142 include telemetry data generated by telemetry module 252, bug reports generated by bug tracking module 254, and screenshots captured by screenshot module 256.

Artifacts engine 142 executes at processor 242 to associate artifact identifiers and values associated with artifact identifiers with the generated artifacts stored in artifacts storage 250, so that each value associated with an artifact identifier identifies an artifact stored in artifacts storage 250. The artifact identifiers include telemetry identifiers that identify telemetry reports stored in artifacts storage 250, the bug identifiers identify bug reports stored in artifacts storage 250, and the screenshot identifiers identify screenshots stored in artifacts storage 250. As discussed above, indications of screenshot identifiers are directly embedded within screenshots.

Each artifact stored in artifacts storage 250 may be associated with a specific time within gameplay session 206 or a specific time period within gameplay session 206. Artifacts engine 142 may execute at processor 242 to send to keychain service 132 indications of values associated with artifact identifiers as well as indications of specific times or time periods within gameplay session 206 associated with the artifacts indicated by the values associated with the artifact identifiers.

Artifacts engine 142 executes at processor 242 to send indications of values associated with telemetry identifiers that are associated with telemetry data stored in artifacts storage 250 along with specific times within gameplay session 206 or a specific time period within gameplay session 206 associated with the telemetry data. Artifacts engine 142 executes at processor 242 to send indications of values associated with bug identifiers that are associated with bug reports stored in artifacts storage 250 along with specific times within gameplay session 206 or a specific time period within gameplay session 206 associated with the bug reports. Artifacts engine 142 executes at processor 242 to send indications of screenshots stored in artifacts storage 250 along with specific times within gameplay session 206 or a specific time period within gameplay session 206 associated with the screenshots. In this way, artifacts engine 142 executes to send indications of values associated with artifact identifiers that are associated with artifacts stored in artifacts storage 250 along with specific times within gameplay session 206 or a specific time period within gameplay session 206 associated with the artifacts to keychain service 132.

Keychain server 130 includes processor 222, communications module 224, and memory 226 that includes keychain storage 228 and keychain service 132. Processor 222 of keychain server 130 is configured to execute instructions, such as instructions physically coded into processor 222, instructions received from software in memory 226, or a combination of both. For example, processor 222 of keychain server 130 may receive and execute instructions of keychain service 132 to perform the functionality of keychain service 132.

Keychain service 132 may execute at processor 222 to receive indications of values associated with a plurality of identifiers that are associated with gameplay session 206 of video gaming application 112 from video gaming application 112 at gaming device 110 and artifacts engine 142 at artifacts server 140. The plurality of identifiers associated with gameplay session 206 may include one or more system identifiers associated with data at one or more external systems, such as one or more gaming servers 120 and/or one or more remote gaming devices 115, one or more contextual identifiers associated with context of video gaming application 112, and one or more artifact identifiers that are generated outside of gameplay session 206.

Receiving an indication of a value associated with an identifier may include receiving a "<name>, <value>" pair, where "<name>" is the name of an identifier and "<value>" is the value associated with the named identifier. One example of a "<name>, <value>" pair received by keychain service 132 may be "Matchmaking ID, 3987", which indicates a matchmaking identifier having an associated value of 3987.

Keychain service 132 may execute at processor 222 to receive indications of values associated with the one or more system identifiers associated with gameplay session 206 and indications of values associated with one or more contextual identifiers associated with gameplay session 206 from video gaming application 112. Examples of system identifiers associated with gameplay session 206 may include matchmaking identifiers associated with online gaming sessions during gameplay session 206, player identifier associated with a gaming network that video gaming application 112 is logged into during gameplay session 206, and the like. The values associated with matchmaking identifiers may identify data regarding specific online gaming sessions that took place during gameplay session 206 that are stored at devices and servers external to gaming device 110, such as one or more gaming servers 120 and/or one or more remote gaming devices 115. Such data may include information such as the players involved in the online gaming session, the location (e.g., network address) and characteristics of the server device that hosted the online gaming session, and other details of the online gaming session. The values associated with the player identifier may identify the gaming network that video gaming application 112 is logged into during gameplay session 206, and may identify data and information associated with the gaming network, such as information regarding the server of the gaming network to which the video gaming application 112 was connected during gameplay session 206.

Examples of contextual identifiers associated with gameplay session 206 may include build version identifiers associated with values that identify the build version of video gaming application 112, user name identifiers associated with values that identify the user names that were logged into video gaming application 112 during gameplay session 206, platform identifiers associated with values that identify the computing platform of gaming device 110, level identifiers associated with values that identify levels of video gaming application 112 that were played during gameplay session 206, start position identifiers associated with values that identifies the start positions of the video gaming application 112 during gameplay session 206, video card identifiers associated with values that identify the type of video card installed in gaming device 110, and the like.

Keychain service 132 may execute at processor 222 to receive indications of values associated with the one or more artifact identifiers associated with gameplay session 206 from artifacts engine 142. Artifact identifiers may be associated with values that identify artifacts stored in artifacts storage 250. Examples of artifact identifiers associated with gameplay session 206 may include bug identifiers associated with values that identify bug reports associated with gameplay session 206, telemetry identifiers associated with values that identify telemetry data associated with gameplay session 206, and screenshot identifiers associated with values associated with screenshots.

Each of the values associated with the plurality of identifiers may be associated with a specific time or time period within gameplay session 206. A specific time associated with a value associated with an identifier may be the specific time within gameplay session 206 when the identifier is associated with the value. Similarly, a specific time period associated with a value associated with an identifier may be the specific time period within gameplay session 206 during which the identifier is associated with the value. As such, receiving indications of values associated with a plurality of identifiers associated with gameplay session 206 may include receiving indications of one of: a specific time or a specific time period within gameplay session 206 that is associated with each of the values associated with the plurality of identifiers. In some examples, if keychain service 132 does not receive an indication of at least one of: a specific time or a specific time period associated with a value associated with an identifier, keychain service 132 may default to the value being associated with the identifier for the entirety of gameplay session 206.

Mapping module 234 of keychain service 132 may execute at processor 222 to associate a keychain identifier value with a gaming session of video gaming application 112, such as gameplay session 206 of video gaming application 112. A keychain identifier value may be a value associated with a keychain identifier that uniquely identifies a keychain of identifiers and associated values associated with gameplay session 206. Mapping module 234 may further execute at processor 222 to generate a keychain associated with gameplay session 206 that is a mapping of the values associated with the plurality of identifiers associated with the gameplay session 206. Examples of the keychain may include any suitable structured data, such as database records, graphs, linked lists, trees, and the like that relates the values associated with the plurality of identifiers associated with gameplay session 206.

Mapping module 234 may execute at processor 222 to determine a mapping of the values associated with the plurality of identifiers by associating, for each identifier from the plurality of identifiers associated with gameplay session 206 during a time period, each value associated with the respective identifier during a time period of gameplay session 206 with at least one of: values that are associated with one or more other identifiers from the plurality of identifiers during at least a portion of the time period of gameplay session 206. The mapping of the values associated with the plurality of identifiers may be referred to as a keychain of the values associated with the plurality of identifiers.

Mapping module 234 may determine the mapping of the values associated with the plurality of identifiers based at least in part on indications of one of: a specific time or a specific time period within gameplay session 206 that is associated with each of the values associated with the plurality of identifiers. Mapping module 234 may, for each value associated with an identifier during a specified time period within gameplay session 206, associate the value for each of one or more values that are associated with one or more identifiers during at least a portion of the specified time period within gameplay session 206.

Thus, the result of mapping module 234 determining the mapping of the values associated with the plurality of identifiers may include each of the plurality of values associated with the plurality of identifiers being associated with a specific time or specific time period within gameplay session 206 during which the value is associated with a specific identifier, and each of the values may be associated with one or more other values that are associated with one or more other identifiers during at least a portion of the specific time or specific time period. For example, for each value that is associated with an identifier during time period $t_x$ to $t_y$ within gameplay session 206, mapping module 234 may determine all values that are associated with identifiers for at least a portion of the time period $t_x$ to $t_y$ within gameplay session 206, and may associate the set of values associated with identifiers determined by mapping module 234 with each other.

In this way, mapping module 234 may determining the mapping of the values associated with the plurality of identifiers. Such a mapping of the values associated with the plurality of identifiers may enable a single value associated with an identifier to be used to index into all other values associated with identifiers during at least a portion of the time period in which the single value is associated with the identifier. For example, if a user knows only the value of associated with a bug identifier, the user may query the mapping of values using the known value associated with the bug identifier to find all other values that are associated with identifiers at the time during which the known value is associated with the bug identifier. The mapping of values may, for example, return a value associated with a matchmaking identifier, which the user may use to query one or more gaming server 120 to receive information related to the online gaming session identified by the value associated with the matchmaking identifier, thereby enabling quick and easy retrieval of information that may be used to debug or profile video gaming application 112.

Keychain service 132 may store the mapping of the values associated with the plurality of identifiers in keychain storage 228 in any structured fashion. For example, the mapping of the values associated with the plurality of identifiers may be stored as database records of a relational database, such as a Structured Query Language (SQL) database.

Keychain service 132 may provide interfaces 236 for querying and accessing the keychain of the values associated with the plurality of identifiers stored in keychain storage 228. In some examples, interfaces 236 may receive a query that indicates a value associated with an identifier from the plurality of identifiers. Interfaces 236 may, in response to receiving the query that indicates the value associated with the identifier from the plurality of identifiers, provide values associated with one or more identifiers that are associated with the value associated with the identifier as indicated by the query based at least in part on the mapping of the values associated with the plurality of identifiers.

Because the value associated with the identifier as indicated by the query is associated with the indicated identifier for a specified time period within gameplay session 206, the values associated with one or more identifiers provided by interfaces 236 in response to the query may be values that are associated with the one or more identifiers during at least a portion of the specified time period.

In some examples, interfaces 236 may provide a publish and subscribe interface that may receive, from downstream services, subscription requests for identifiers from the plurality of identifiers of a gameplay session, such as gameplay session 206. In response to receiving an indication of a request to subscribe to an identifier from the plurality of identifiers for a gameplay session from a requesting computing device, such as one or more computing devices 135, interfaces 236 may send updated values associated with the indicated identifier as keychain service 132 receives updated values associated with the indicated identifier from gaming device 110 and/or artifacts server 140 until the end of the gameplay session. For example, if interfaces 236 receives a request to subscribe to a bug identifier for gameplay session 206 from a requesting computing device, interfaces 236 may, from the start of gameplay session 206, send updated values associated with the bug identifier to the requesting computing device upon receiving updated values associated with the bug identifier from artifacts engine 142 until the end of gameplay session 206.

In some examples, if the mapping of the values associated with the plurality of identifiers is stored as database records of a structured database, such as a SQL database, interfaces 236 may be able to receive and respond to structured database queries, such as SQL queries for specific records of the database containing associations of values and identifiers, and may be able to respond to such structured database queries with the requested associations of values and identifiers based on the queries.

Figure 3A:
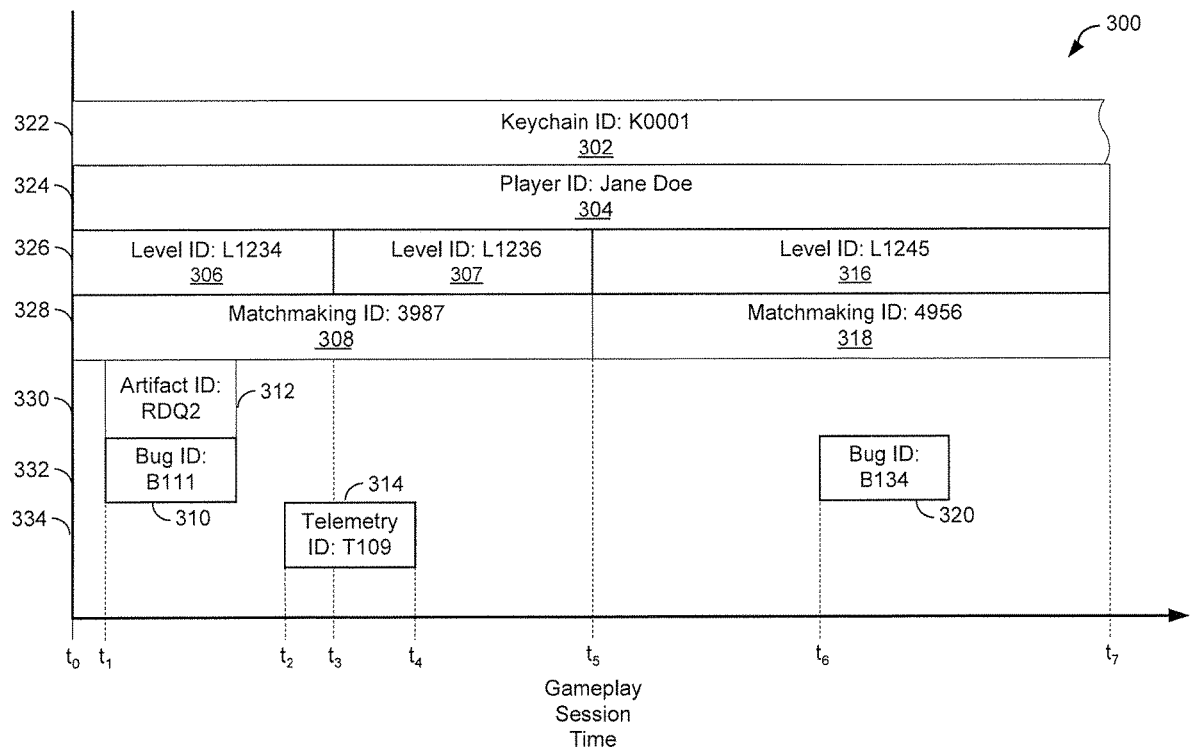
FIG. 3A is a block diagram illustrating an example timeline of example identifiers and example artifacts associated with an example gaming session, according to certain aspects of the disclosure.

FIG. 3A is a block diagram illustrating an example timeline of example identifiers and example artifacts associated with an example gaming session, according to certain aspects of the disclosure. FIG. 3A is described with respect to the components of architecture 100 in FIGS. 1 and 2. FIG. 3A is just an example of some of the example values of example identifiers and artifacts that may be associated with an example gaming session, and it should be understood that a gaming session may be associated with any number of identifiers and artifacts having any number of suitable values not illustrated by FIG. 3A.

As shown in FIG. 3A, values 302, 304, 306, 307, 308, 310, 312, 314, 316, 318, and 320 associated with identifiers 322, 324, 326, 328, 330, 332, and 334 are associated with gameplay session 206, and are plotted in timeline 300 from the start of gameplay session 206 at time to to the end of gameplay session 206 at $t_7$. Timeline 300 illustrates that values 302, 304, 306, 307, 308, 310, 312, 314, 316, 318, and 320 are associated with identifiers 322, 324, 326, 328, 330, 332, and 334 at either a specific time between the start of gameplay session 206 at time to to the end of gameplay session 206 at time $t_7$ or within a specific time period between the start of gameplay session 206 at time to to the end of gameplay session 206 at time $t_7$. Thus, while a value is associated with an identifier during a time period within gameplay session 206, another identifier during that same period may change its associated values and may be associated with two or more values during that same time period.

As can be seen, at any point in time in timeline 300, one or more identifiers may each be associated with a single value. Meanwhile, during a time period in timeline 300, it is possible for one or more identifiers to each be associated with a single value, while another one or more identifiers may each be associated with two or more different values. By determine a mapping of the values associated with the plurality of identifiers and the plurality of artifacts, keychain service 132 generates a representation of a timeline of values associated with artifacts, such as timeline 300, and stores such a representation of a timeline of values associated with artifacts in keychain storage 228. Further, keychain service 132 may also track the start of gameplay session 206 (i.e., at time $t_0$) and the end of gameplay session 206 (i.e., at time $t_7$) to maintain a timeline independent of the individual identifiers 322-334 that are tracked by keychain service 132. By tracking the start and the end of gameplay session 206, keychain service 132 may be able to coordinate with downstream services to enable such downstream services to subscribe to and receive updated values of identifiers of gameplay session 206 during the duration of gameplay session 206.

In the example of FIG. 3A, because value 302 of keychain identifier 322 and value 304 of player identifier 324 do not change during gameplay session 206, keychain service 132 may execute at processor 222 of keychain server 130 to associate value 302 of keychain identifier 322 with value 304 of player identifier 324, and may also associate value 302 of keychain identifier 322 and value 304 of player identifier 324 with values 306, 307, 308, 310, 312, 314, 316, 318, and 320 of all other identifiers 326, 328, 330, 332, and 334 associated with gameplay session 206.

Level identifier 326 associated with gameplay session 206 may indicate the level of the game in gaming application that is currently being played. Because a player may move through different levels of the game during gameplay session 206, such as by finishing a first level to move onto a second level, level identifiers 326 may be associated with different values 306, 307, and 316 during gameplay session 206 that indicate the different levels of the game encountered during gameplay session 206. In the example of FIG. 3A, level identifier 326 may be associated with value 306 from time $t_0$ to time $t_3$, associated with value 307 from time $t_3$ to time $t_5$, and associated with value 316 from time $t_5$ to time $t_7$.

Matchmaking identifier 328 associated with gameplay session 206 may indicate each different online game between the player of video gaming application 112 and an online opponent. Thus, each time video gaming application 112 starts a game with an online opponent, matchmaking identifier 328 may be associated with a different value from the start of the game until the game ends. In the example of FIG. 3A, matchmaking identifier 328 may be associated with value 308 from time $t_0$ to time $t_5$ and associated with value 318 from time $t_5$ to time $t_7$.

Artifact identifier 330 associated with gameplay session 206 may identify an artifact associated with a specific time within gameplay session 206, such as a screenshot of gameplay session 206. In the example of FIG. 3A, artifact identifier 330 may be associated with value 312 at time $t_1$, which may be the specific time within gameplay session 206 when the screenshot associated with value 312 of artifact identifier 330 was taken.

Bug identifier 332 associated with gameplay session 206 may identify bug reports associated with gameplay session 206. For example, a player or a tester of video gaming application 112 may submit bug reports at specific times within gameplay session 206. In the example of FIG. 3A, bug identifier 332 may be associated with value 310 at time $t_1$ and with value 320 at time $t_6$ that are associated with bug reports submitted at times $t_1$ and $t_6$ within gameplay session 206, respectively.

Telemetry identifier 334 associated with gameplay session 206 may identify telemetry data associated with a time period within gameplay session 206. For example, a telemetry application or process may execute at, for example, processor 212 of gaming device 110 or at processor 242 of artifacts server 140 that monitors video gaming application 112 and obtains telemetry data based on the monitoring of video gaming application 112. In the example of FIG. 3A, telemetry identifier 334 may be associated with value 314 from time $t_2$ to time $t_4$ within gameplay session 206 that is associated with telemetry data captured from time $t_2$ to time $t_4$ of gameplay session 206.

Keychain service 132 may execute at processor 222 to determine associations of values 302, 304, 306, 307, 308, 310, 312, 314, 316, 318, and 320 of identifiers 322, 324, 326, 328, 330, 332, and 334 to associate each value that is associated with an identifier during a time period of gameplay session 206 with values associated with one or more other identifiers during at least a portion of the same time period of gameplay session 206.

Keychain service 132 may execute at processor 222 to associate value 302 associated with keychain identifier 322 during the time period $t_0$ to $t_7$ with values that are associated with identifiers during at least a portion of the same time period $t_0$ to $t_7$ of gameplay session 206. Because values 304, 306, 307, 310, 312, 314, 316, 318, and 320 are all associated with identifiers 324, 326, 328, 330, 332, and 334 during at least a portion of the time period $t_0$ to $t_7$ of gameplay session 206, keychain service 132 may execute to associate value 302 associated with keychain identifier 322 with value 304 associated with player identifier 324, values 306, 307, and 316 associated with level identifier 326, values 308 and 318 associated with matchmaking identifiers 328, value 312 associated with artifact identifier 330, values 310 and 320 associated with bug identifier 332, and value 314 associated with telemetry identifier 334.

Keychain service 132 may execute at processor 222 to associate value 304 associated with keychain identifier 324 during the time period to to $t_7$ with values that are associated with identifiers during at least a portion of the same time period to to $t_7$ of gameplay session 206. Because values 302, 306, 307, 310, 312, 314, 316, 318, and 320 are all associated with identifiers 322, 326, 328, 330, 332, and 334 during at least a portion of the time period $t_0$ to $t_7$ of gameplay session 206, keychain service 132 may execute to associate value 304 associated with player identifier 324 with value 302 associated with keychain identifier 322, values 306, 307, and 316 associated with level identifier 326, values 308 and 318 associated with matchmaking identifiers 328, value 312 associated with artifact identifier 330, values 310 and 320 associated with bug identifier 332, and value 314 associated with telemetry identifier 334.

Keychain service 132 may execute at processor 222 to associate value 306 associated with level identifier 326 during the time period $t_0$ to $t_3$ with values that are associated with identifiers during at least a portion of the same time period $t_0$ to $t_3$ of gameplay session 206. Because values 302, 304, 308, 310, 312, and 314 are all associated with identifiers 322, 324, 328, 332, 330, and 334, respectively, during at least a portion of the same time period $t_0$ to $t_3$ of gameplay session 206, keychain service 132 may execute to associate value 302 associated with keychain identifier 322 with value 306 associated with level identifier 326, value 304 associated with player identifier 324 with value 306 associated with level identifier 326, value 308 associated with matchmaking identifier 328 with value 306 associated with level identifier 326, value 312 associated with artifact identifier 330 with value 306 associated with level identifier 326, value 310 associated with bug identifier 332 with value 306 associated with level identifier 326, and value 314 associated with telemetry identifier 334 with value 306 associated with level identifier 326.

Keychain service 132 may execute at processor 222 to associate value 307 associated with level identifier 326 during the time period $t_3$ to $t_5$ with values that are associated with identifiers during at least a portion of the same time period $t_3$ to $t_5$ of gameplay session 206. Because values 302, 304, 308, and 314 are all associated with identifiers 322, 324, 328, and 334, respectively, during at least a portion of the same time period $t_3$ to $t_5$ of gameplay session 206, keychain service 132 may execute to associate value 302 associated with keychain identifier 322 with value 307 associated with level identifier 326, value 304 associated with player identifier 324 with value 307 associated with level identifier 326, value 308 associated with matchmaking identifier 328 with value 307 associated with level identifier 326, and value 314 associated with telemetry identifier 332 with value 307 associated with level identifier 326.

Keychain service 132 may execute at processor 222 to associate value 316 associated with level identifier 326 during the time period $t_5$ to $t_7$ with values that are associated with identifiers during at least a portion of the same time period $t_5$ to $t_7$ of gameplay session 206. Because values 302, 304, 318, and 320 are all associated with identifiers 322, 324, 328, and 332, respectively, during at least a portion of the same time period $t_5$ to $t_7$ of gameplay session 206, keychain service 132 may execute to associate value 302 associated with keychain identifier 322 with value 316 associated with level identifier 326, value 304 associated with player identifier 324 with value 316 associated with level identifier 326, value 318 associated with matchmaking identifier 328 with value 316 associated with level identifier 326, and value 320 associated with bug identifier 332 with value 316 associated with level identifier 326.

Keychain service 132 may execute at processor 222 to associate value 308 associated with level identifier 328 during the time period $t_0$ to $t_3$ with values that are associated with identifiers during at least a portion of the same time period $t_0$ to $t_5$ of gameplay session 206. Because values 302, 304, 306, 307, 310, 312, and 314 are all associated with identifiers 322, 324, 328, 332, 330, and 334 during at least a portion of the same time period $t_0$ to $t_5$ of gameplay session 206, keychain service 132 may execute to associate value 302 associated with keychain identifier 322 with value 308 associated with level identifier 328, value 304 associated with player identifier 324 with value 308 associated with level identifier 328, value 306 associated with level identifier 326 with value 308 associated with level identifier 328, value 307 associated with level identifier 326 with value 308 associated with level identifier 328, value 312 associated with artifact identifier 330 with value 308 associated with level identifier 328, value 310 associated with bug identifier 332 with value 308 associated with level identifier 328, and value 314 associated with telemetry identifier 334 with value 308 associated with level identifier 328.

Keychain service 132 may execute at processor 222 to associate value 318 associated with matchmaking identifier 328 during the time period $t_5$ to $t_7$ with values that are associated with identifiers during at least a portion of the same time period $t_5$ to $t_7$ of gameplay session 206. Because values 302, 304, 316, and 320 are all associated with identifiers 322, 324, 326, and 332, respectively, during at least a portion of the same time period $t_5$ to $t_7$ of gameplay session 206, keychain service 132 may execute to associate value 302 associated with keychain identifier 322 with value 318 associated with matchmaking identifier 328, value 304 associated with player identifier 324 with value 318 associated with matchmaking identifier 328, value 316 associated with level identifier 326 with value 318 associated with matchmaking identifier 328, and value 320 associated with bug identifier 332 with value 318 associated with matchmaking identifier 328.

Keychain service 132 may execute at processor 222 to associate value 312 associated with artifact identifier 330 at time $t_1$ with values that are associated with identifiers at time $t_1$ of gameplay session 206. Because values 302, 304, 306, 308, and 310 are associated with identifiers 322, 324, 326, 328, and 332 during time $t_1$ of gameplay session 206, keychain service 132 may execute to associate value 302 associated with keychain identifier 322 with value 312 associated with artifact identifier 330, value 304 associated with player identifier 324 with value 312 associated with artifact identifier 330, value 306 associated with level identifier 326 with value 312 associated with artifact identifier 330, value 308 associated with level identifier 326 with value 312 associated with artifact identifier 330, and value 310 associated with bug identifier 332 with value 312 associated with artifact identifier 330.

Keychain service 132 may execute at processor 222 to associate value 310 associated with bug identifier 332 at time $t_1$ with values that are associated with identifiers at time $t_1$ of gameplay session 206. Because values 302, 304, 306, 308, and 312 are associated with identifiers 322, 324, 326, 328, and 332 during time $t_1$ of gameplay session 206, keychain service 132 may execute to associate value 302 associated with keychain identifier 322 with value 310 associated with bug identifier 332, value 304 associated with player identifier 324 with value 310 associated with bug identifier 332, value 306 associated with level identifier 326 with value 310 associated with bug identifier 332, value 308 associated with level identifier 326 with value 310 associated with bug identifier 332, and value 312 associated with artifact identifier 330 with value 310 associated with bug identifier 332.

Keychain service 132 may execute at processor 222 to associate value 320 associated with bug identifier 332 at time $t_6$ with values that are associated with identifiers at time $t_6$ of gameplay session 206. Because values 302, 304, 316, and 318 are associated with identifiers 322, 324, 326, and 328 during time $t_6$ of gameplay session 206, keychain service 132 may execute to associate value 302 associated with keychain identifier 322 with value 320 associated with bug identifier 332, value 304 associated with player identifier 324 with value 320 associated with bug identifier 332, value 316 associated with level identifier 326 with value 320 associated with bug identifier 332, and value 318 associated with level identifier 326 with value 320 associated with bug identifier 332.

Keychain service 132 may execute at processor 222 to associate value 314 associated with telemetry identifier 334 during the time period $t_2$ to $t_4$ with values that are associated with identifiers during the time period $t_2$ to $t_4$ of gameplay session 206. Because values 302, 304, 306, 307, and 308 are associated with identifiers 322, 324, 326, and 328 during the time period $t_2$ to $t_4$ of gameplay session 206, keychain service 132 may execute to associate value 302 associated with keychain identifier 322 with value 314 associated with telemetry identifier 334, value 304 associated with player identifier 324 value 314 associated with telemetry identifier 334, value 306 associated with level identifier 326 with value 314 associated with telemetry identifier 334, value 307 associated with level identifier 326 with value 314 associated with telemetry identifier 334 and value 308 associated with level identifier 326 with value 314 associated with telemetry identifier 334.

As can be seen, a value associated with an identifier during a time period during gameplay session 206 may be associated with values that are associated with other identifiers during at least a portion of the same time period. For example, value 306 that is associated with level identifier 326 during the time period $t_0$ to $t_3$ may be associated with values that are associated with identifiers only during a part (but not all) of the time period $t_0$ to $t_3$, such as value 310 that is associated with bug identifier 322 only at time $t_1$. Further, a value associated with an identifier during a time period during gameplay session 206 may include an identifier that is associated with an identifier only at a specific time, such as value 310 that is associated with bug identifier 322 only at time $t_1$.

In addition, a value associated with an identifier during a time period during gameplay session 206 may be associated with different values that are associated with the same identifier during at least a portion of the time period when the value is associated with the identifier. For example, value 314 that is associated with telemetry identifier 314 during the time period $t_2$ to $t_4$ may be associated with both values 306 and 307 with level identifier 326 because level identifier 326 is associated with value 306 during time period $t_2$ to $t_3$ and is further associated with value 307 during time period $t_3$ to $t_4$, where both time periods $t_2$ to $t_3$ and $t_3$ to $t_4$ are within the time period $t_2$ to $t_4$.

Figure 3B:
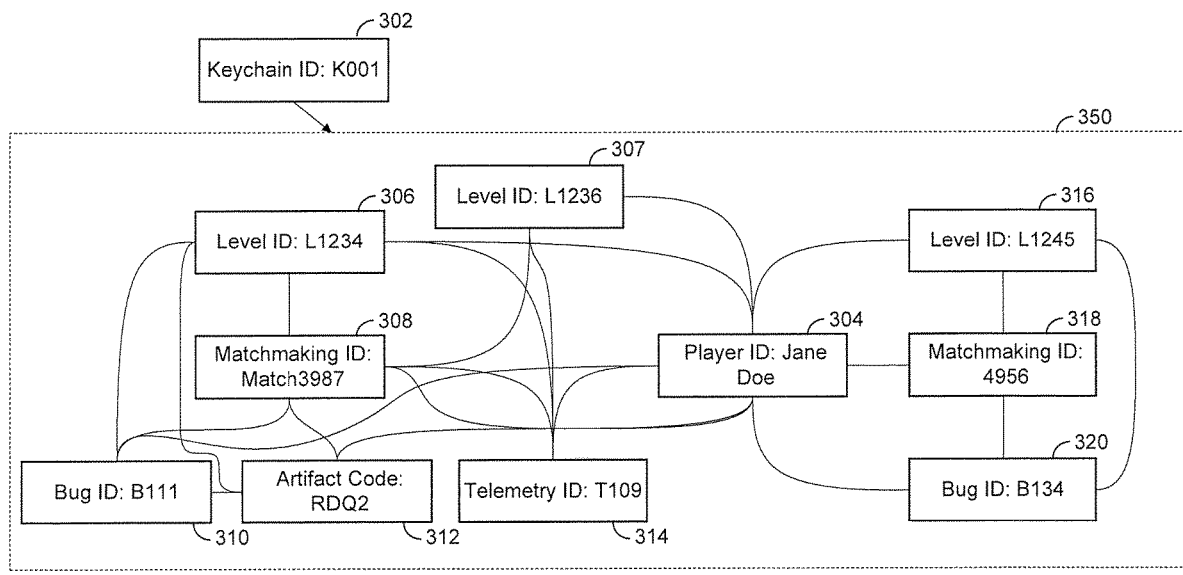
FIG. 3B is a block diagram illustrating an example graph of associations between values associated with identifiers of an example gaming session, according to certain aspects of the disclosure.

FIG. 3B is a block diagram illustrating an example graph of associations between values associated with identifiers of an example gaming session, according to certain aspects of the disclosure. FIG. 3B is an alternative way of illustrating the same associations of associated values of identifiers illustrated in timeline 300 of FIG. 3A.

As shown in FIG. 3B, keychain 350 is a mapping of the values associated with a plurality of identifiers associated with a gaming session, such as gameplay session 206, as determined by keychain service 132, and keychain 350 is associated with a keychain identifier value 302 of "K001". Keychain identifier value 302 is connected with each identifier value within keychain 350. Within keychain 350, an identifier value is illustrated in FIG. 3B as being connected to another identifier value if and only if they are associated with each other. For example, player identifier value 304 of "Jane Doe" is only connected to every identifier value within keychain 350. Meanwhile, level identifier value 306 is connected to player identifier value 304, matchmaking identifier value 308, artifact identifier value 312, bug identifier value 310, and telemetry identifier value 314.

As shown in FIG. 3B, level identifier value 307 is connected to player identifier value 304, matchmaking identifier value 308, and telemetry identifier value 314. Level identifier value 316 is connected to player identifier value 304, matchmaking identifier value 318, and bug identifier value 320. Matchmaking identifier value 308 is connected to player identifier value 304, level identifier values 306 and 307, artifact identifier value 312, bug identifier 310, and telemetry identifier value 314. Matchmaking identifier value 318 is connected to player identifier value 304, level identifier value 316, and bug identifier value 320. Artifact identifier value 312 is connected to player identifier value 304, level identifier value 306, matchmaking identifier value 308, and bug identifier value 310. Bug identifier value 310 is connected to player identifier value 304, level identifier value 306, matchmaking identifier value 308, and artifact identifier value 312. Bug identifier value 320 is connected to player identifier value 304, level identifier value 316, and matchmaking identifier value 318. Telemetry identifier value 314 is connected to player identifier value 304, level identifier values 306 and 307, and matchmaking identifier value 308. As can be seen via visual inspection, a value of an identifier is associated with another value of another identifier if and only if they are connected with each other.

Figure 4:
FIG. 4 illustrates an example artifact associated with an example gameplay session according to certain aspects of the disclosure.

FIG. 4 illustrates an example artifact associated with an example gameplay session according to certain aspects of the disclosure. As discussed above, each artifact associated with gameplay session 206 is associated with an artifact identifier having a value that identifies the associated artifact. As shown in FIG. 4, an example of an artifact associated with gameplay session 206 may be screenshot 400. Screenshot 400 may be captured via screenshot module 256 during gameplay session 206. A screenshot such as screenshot 400 may be a frame of video captured at a specific time during gameplay session 206 that is output by video gaming application 112 during gameplay session 206 that is displayed at output device 214.

Screenshot 400 may include visual indication 402 of a value associated with an artifact identifier (e.g., a screenshot identifier) that is embedded within screenshot 400. In some examples, video gaming application 112 may embed visual indication 402 of the value associated with the artifact identifier, and may display frames that include the embedded visual indication 402 of the value associated with the artifact identifier during gameplay session 206. In other examples, when screenshot module 256 captures screenshot 400, screenshot module 256 may modify the captured screenshot to embed visual indication 402 of the value associated with the artifact identifier in the version of screenshot 400 that it stores in artifacts storage 250.

Because screenshot 400 captured by screenshot module 256 and stored in artifacts storage 250 includes an indication of the value associated with the artifact identifier associated with itself, screenshot 400 may be used to query keychain service 132 to determine the values associated with identifiers associated with gameplay session 206 at the specific time during gameplay session 206 that screenshot 400 was captured by screenshot module 256.

Figure 5:
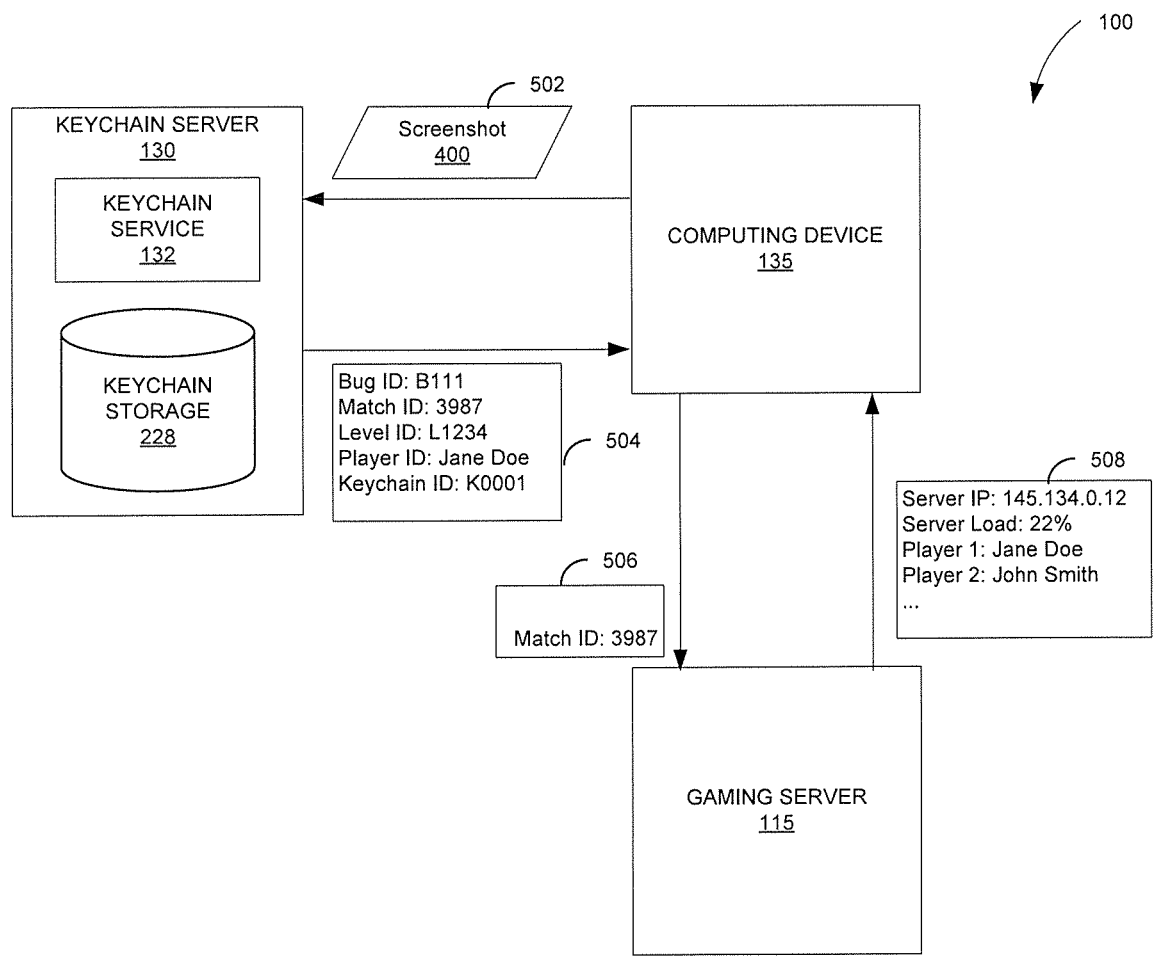
FIG. 5 is a block diagram illustrating an example computing device that may query an example keychain server to receive example identifiers that the example computing device may use to determine additional details of an example gaming server in the example architecture of FIGS. 1 and 2, according to certain aspects of the disclosure.

FIG. 5 is a block diagram illustrating an example computing device that may query an example keychain server to receive example identifiers that the example computing device may use to determine additional details of an example gaming server in the example architecture of FIGS. 1 and 2, according to certain aspects of the disclosure. As shown in FIG. 5, computing device 135 may send query 502 that indicates a value associated with an identifier from a plurality of identifiers to keychain service 132 of keychain server 130 to query for values associated with one or more identifiers that are associated with the value associated with the identifier indicated by query 502.

As discussed above, an identifier is associated with a value at a specific time within gameplay session 206 or within a period of time within gameplay session 206. Thus, the identifier indicated by query 502 is associated with its associated value as indicated by query 502 at a specific time within gameplay session 206 or within a period of time within gameplay session 206. In the example of FIG. 5, query 502 may include an indication of screenshot 400 that includes visual indication 402 of a value associated with an artifact identifier that is embedded within screenshot 400.

Screenshot 400 includes visual indication 402 of an artifact identifier having an associated value of "RDQ2". Keychain service 132 may receive screenshot 400 and may query keychain storage 228 for identifiers having associated values that are associated with an artifact identifier having the associated value of "RDQ2". Keychain service 132 may determine that a bug identifier having an associated value of "B111", a matchmaking identifier having an associated value of "3987", a level identifier having an associated value of "L1234", a player identifier having an associated value of "Jane Doe", and a keychain identifier having an associated value of "K0001" may each be associated with the artifact identifier having the associated value of "RDQ2" as indicated by query 502. In response, keychain service 132 may send reply 504 that includes indications of the associated identifiers and their associated values that are each associated with the artifact identifier having the associated value of "RDQ2" as indicated by query 502.

Computing device 135 may use the identifiers and associated values indicated by query 502 to query external systems and servers with which video gaming application 112 communicated during gameplay session 206 in order to gather additional data about such external systems and servers which may be used to profile or debug video gaming application 112. In the example of FIG. 5, computing device 135 may send query 506 that indicates the matchmaking identifier and its associated value of "3987" to gaming server 115 to request information regarding the online gaming session associated with the matchmaking identifier value of "3987" indicated in query 506.

In response to receiving query 506, gaming server 115 may send response 508 to computing device 135 that includes additional details of the online gaming session, such as the IP address of the server on which the online gaming session took place, the server load of the server during the online gaming session, the players involved in the online gaming session, and the like. Computing device 135 may receive response 508 and may use the details of the online gaming session included in response 508 to further profile gameplay session 206.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

Figure 6:
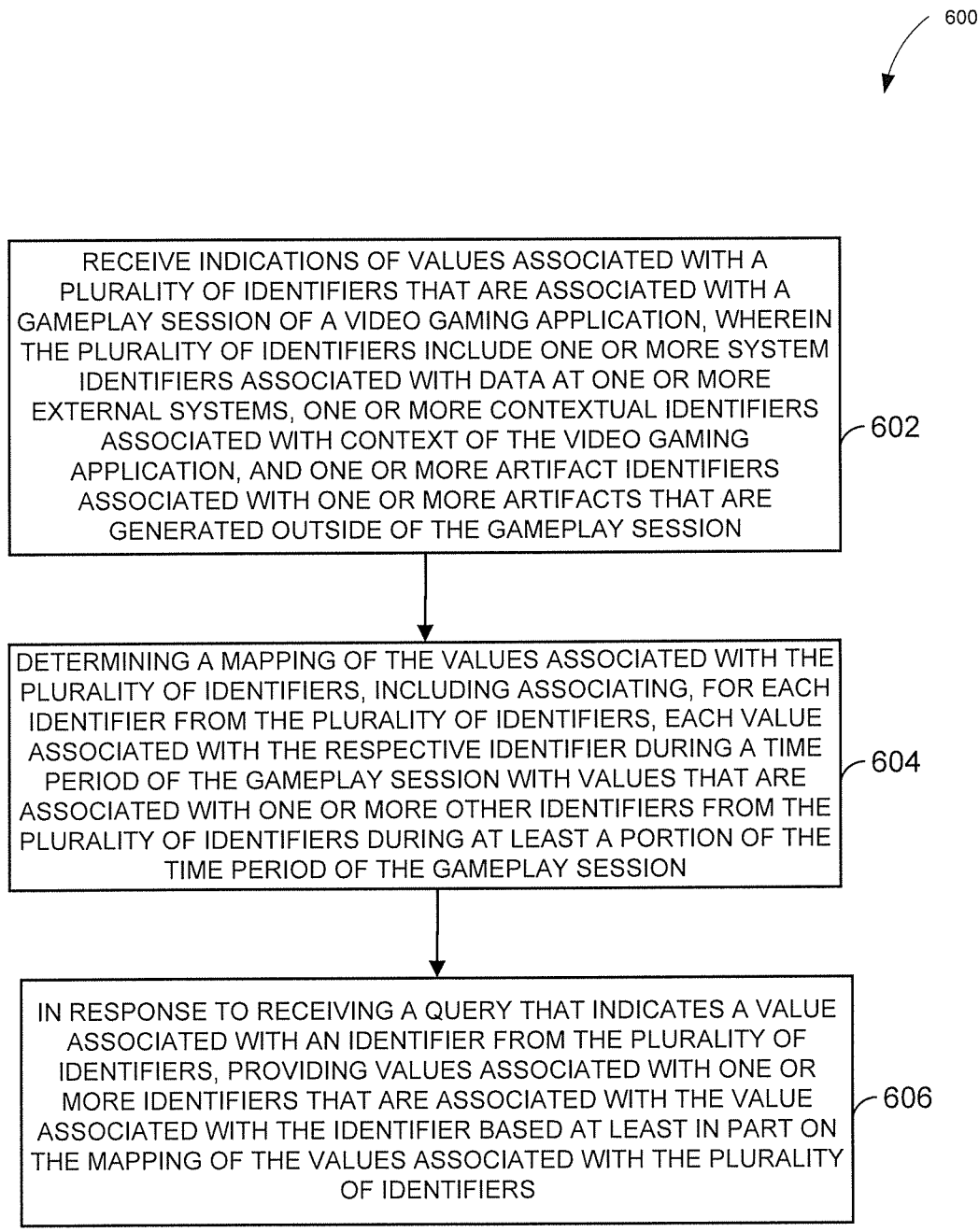
FIG. 6 illustrates an example process for profiling runtime performance of a video gaming application using the example architecture 100 of FIGS. 1-5.

FIG. 6 illustrates an example process 600 for profiling runtime performance of a video gaming application using the example architecture 100 of FIGS. 1-5. While FIG. 6 is described with reference to FIGS. 1-5, it should be noted that the process steps of FIG. 6 may be performed by other systems.

Process 600 includes keychain service 132 receiving indications of values associated with a plurality of identifiers that are associated with a gameplay session 206 of a video gaming application 112, wherein the plurality of identifiers include one or more system identifiers associated with data at one or more external systems, one or more contextual identifiers associated with context of the video gaming application 112, and one or more artifact identifiers associated with one or more artifacts that are generated outside of the gameplay session (602).

Process 600 further includes keychain service 132 determining a mapping of the values associated with the plurality of identifiers, including associating, for each identifier from the plurality of identifiers, each value associated with the respective identifier during a time period of the gameplay session 206 with values associated with a respective one or more other identifiers from the plurality of identifiers during at least a portion of the time period of the gameplay session 206 (604).

Process 600 further includes in response to keychain service 132 receiving a query that indicates a value associated with an identifier from the plurality of identifiers, keychain service 132 providing values associated with one or more identifiers that are associated with the value associated with the identifier based at least in part on the mapping of the values associated with the plurality of identifiers (606).

In some examples, keychain service 132 associating, for each identifier from the plurality of identifiers, each value associated with the respective identifier during the time period of the gameplay session 206 with the values associated with a respective one or more other identifiers from the plurality of identifiers during at least the portion of the time period of the gameplay session 206 may further include keychain service 132 associating the respective value associated with the respective identifier during the time period of the gameplay session 206 with two or more different values associated with a same identifier from the plurality of identifiers during at least the portion of the time period of the gameplay session 206.

In some examples, process 600 further includes keychain service 132 receiving, from a requesting computing device 135, an indication of a request to subscribe a second identifier from the plurality of identifiers. Process 600 may further include in response to keychain service 132 receiving the indication of the request to subscribe to the second identifier, keychain service 132 sending updated values of the second identifier to the requesting computing device 135 as the updated values of the second identifier are received from the video gaming application 112.

In some examples, the one or more artifacts that are generated outside of the gameplay session 206 include a screenshot 400 of the video gaming application 112 captured at a specific time during the gameplay session 206, and the screenshot 400 includes a value associated with an artifact identifier embedded within the screenshot 400. In some examples, keychain service 132 receiving the query that indicates the value associated with an identifier from the plurality of identifiers includes keychain service 132 receiving the screenshot 400 that includes the value associated with the artifact identifier embedded within the screenshot 400.

In some examples, the one or more artifacts that are generated outside of the gameplay session 206 includes telemetry data of the video gaming application 112 during the gameplay session 206 that is generated by a telemetry program, such as telemetry module 252, and the telemetry data is associated with a telemetry identifier from the one or more artifact identifiers.

In some examples, the one or more artifacts that are generated outside of the gameplay session 206 includes a bug report that is generated by a bug tracking application, such as bug tracking module 254, and the bug report is associated with a bug identifier from the one or more artifact identifiers.

In some examples, the one or more system identifiers include a matchmaking identifier that is associated with an online gaming session.

In some examples, process 600 includes keychain service 132 storing the mapping of the values associated with the plurality of identifiers and the plurality of artifacts in a relational database.

Hardware Overview

Figure 7:
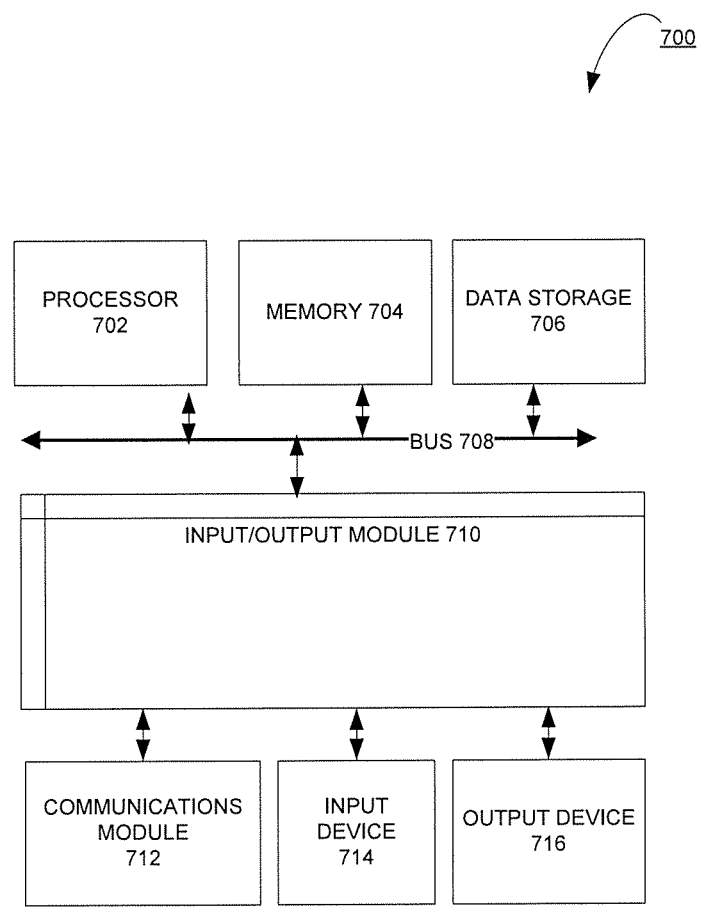
FIG. 7 is a block diagram illustrating an example computer system with which the example gaming device, example keychain server, and example artifacts server of FIGS. 1 and 2 can be implemented.

FIG. 7 is a block diagram illustrating an example computer system 700 with which gaming device 110, keychain server 130, and artifacts server 140 of FIGS. 1 and 2 can be implemented. In certain aspects, the computer system 700 may be implemented using hardware or a combination of software and hardware, either in a dedicated server, or integrated into another entity, or distributed across multiple entities.

Computer system 700 (e.g., gaming device 110, keychain server 130, and/or artifacts server 130) includes a bus 708 or other communication mechanism for communicating information, and a processor 702 (e.g., processor 212, 222 and/or 242) coupled with bus 708 for processing information. According to one aspect, the computer system 700 can be a cloud computing server of an IaaS that is able to support PaaS and SaaS services. In one aspect, the computer system 700 is implemented as one or more special-purpose computing devices. The special-purpose computing device may be hard-wired to perform the disclosed techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques. By way of example, the computer system 700 may be implemented with one or more processors 702. Processor 702 may be a general-purpose microprocessor, a microcontroller, a Digital Signal Processor (DSP), an ASIC, a FPGA, a Programmable Logic Device (PLD), a controller, a state machine, gated logic, discrete hardware components, or any other suitable entity that can perform calculations or other manipulations of information.

Computer system 700 can include, in addition to hardware, code that creates an execution environment for the computer program in question, e.g., code that constitutes processor firmware, a protocol stack, a database management system, an operating system, or a combination of one or more of them stored in an included memory 704 (e.g., memory 202, memory 226, and/or memory 246), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 708 for storing information and instructions to be executed by processor 702. The processor 702 and the memory 704 can be supplemented by, or incorporated in, special purpose logic circuitry. Expansion memory may also be provided and connected to computer system 700 through input/output module 710, which may include, for example, a SIMM (Single In Line Memory Module) card interface. Such expansion memory may provide extra storage space for computer system 700, or may also store applications or other information for computer system 700. Specifically, expansion memory may include instructions to carry out or supplement the processes described above, and may include secure information also. Thus, for example, expansion memory may be provided as a security module for computer system 700, and may be programmed with instructions that permit secure use of computer system 700. In addition, secure applications may be provided via the SIMM cards, along with additional information, such as placing identifying information on the SIMM card in a non-hackable manner.

The instructions may be stored in the memory 704 and implemented in one or more computer program products, e.g., one or more modules of computer program instructions encoded on a computer readable medium for execution by, or to control the operation of, the computer system 700, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages. Memory 704 may also be used for storing temporary variable or other intermediate information during execution of instructions to be executed by processor 702.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network, such as in a cloud-computing environment. The processes and logic flows described in this specification can be performed by one or more programmable processors executing one or more computer programs to perform functions by operating on input data and generating output.

Computer system 700 further includes a data storage device 706 such as a magnetic disk or optical disk, coupled to bus 708 for storing information and instructions. Computer system 700 may be coupled via input/output module 710 to various devices. The input/output module 710 can be any input/output module. Example input/output modules 710 include data ports such as USB ports. In addition, input/output module 710 may be provided in communication with processor 702, so as to enable near area communication of computer system 700 with other devices. The input/output module 710 may provide, for example, for wired communication in some implementations, or for wireless communication in other implementations, and multiple interfaces may also be used. The input/output module 710 is configured to connect to a communications module 712. Example communications modules 712 (e.g., communication module 210, 224, and 244) include networking interface cards, such as Ethernet cards and modems.

The components of the system can be interconnected by any form or medium of digital data communication, e.g., a communication network. The communication network (e.g., network 150) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

For example, in certain aspects, communications module 712 can provide a two-way data communication coupling to a network link that is connected to a local network. Wireless links and wireless communication may also be implemented. Wireless communication may be provided under various modes or protocols, such as GSM (Global System for Mobile Communications), Short Message Service (SMS), Enhanced Messaging Service (EMS), or Multimedia Messaging Service (MIMS) messaging, CDMA (Code Division Multiple Access), Time division multiple access (TDMA), Personal Digital Cellular (PDC), Wideband CDMA, General Packet Radio Service (GPRS), or LTE (Long-Term Evolution), among others. Such communication may occur, for example, through a radio-frequency transceiver. In addition, short-range communication may occur, such as using a BLUETOOTH, WI-FI, or other such transceiver.

In any such implementation, communications module 712 sends and receives electrical, electromagnetic or optical signals that carry digital data streams representing various types of information. The network link typically provides data communication through one or more networks to other data devices. For example, the network link of the communications module 712 may provide a connection through local network to a host computer or to data equipment operated by an Internet Service Provider (ISP). The ISP in turn provides data communication services through the world wide packet data communication network now commonly referred to as the "Internet". The local network and Internet both use electrical, electromagnetic or optical signals that carry digital data streams. The signals through the various networks and the signals on the network link and through communications module 712, which carry the digital data to and from computer system 700, are example forms of transmission media.

Computer system 700 can send messages and receive data, including program code, through the network(s), the network link and communications module 712. In the Internet example, a server might transmit a requested code for an application program through Internet, the ISP, the local network and communications module 712. The received code may be executed by processor 702 as it is received, and/or stored in data storage 706 for later execution.

In certain aspects, the input/output module 710 is configured to connect to a plurality of devices, such as an input device 714 (e.g., input device 216) and/or an output device 716 (e.g., output device 214). Example input devices 714 include a keyboard and a pointing device, e.g., a mouse or a trackball, by which a user can provide input to the computer system 700. Other kinds of input devices 714 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 716 include display devices, such as a LED (light emitting diode), CRT (cathode ray tube), LCD (liquid crystal display) screen, a TFT LCD (Thin-Film-Transistor Liquid Crystal Display) or an OLED (Organic Light Emitting Diode) display, for displaying information to the user. The output device 716 may comprise appropriate circuitry for driving the output device 716 to present graphical and other information to a user.

According to one aspect of the present disclosure, gaming device 110, keychain server 130, and artifacts server 140 can be implemented using a computer system 700 in response to processor 702 executing one or more sequences of one or more instructions contained in memory 704. Such instructions may be read into memory 704 from another machine-readable medium, such as data storage device 706. Execution of the sequences of instructions contained in main memory 704 causes processor 702 to perform the process steps described herein. One or more processors in a multi-processing arrangement may also be employed to execute the sequences of instructions contained in memory 704. Processor 702 may process the executable instructions and/or data structures by remotely accessing the computer program product, for example by downloading the executable instructions and/or data structures from a remote server through communications module 712 (e.g., as in a cloud-computing environment). In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. For example, some aspects of the subject matter described in this specification may be performed on a cloud-computing environment. Accordingly, in certain aspects a user of systems and methods as disclosed herein may perform at least some of the steps by accessing a cloud server through a network connection. Further, data files, circuit diagrams, performance specifications and the like resulting from the disclosure may be stored in a database server in the cloud-computing environment, or may be downloaded to a private storage device from the cloud-computing environment.

Computing system 700 can include clients and servers. A client and server are generally remote from each other and typically interact through a communication network. The relationship of client and server arises by virtue of computer programs running on the respective computers and having a client-server relationship to each other. Computer system 700 can be, for example, and without limitation, a desktop computer, laptop computer, or tablet computer. Computer system 700 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer-readable medium" as used herein refers to any medium or media that participates in providing instructions or data to processor 702 for execution. The term "storage medium" as used herein refers to any non-transitory media that store data and/or instructions that cause a machine to operate in a specific fashion. Such a medium may take many forms, including, but not limited to, non-volatile media, volatile media, and transmission media. Non-volatile media include, for example, optical disks, magnetic disks, or flash memory, such as data storage device 706. Volatile media include dynamic memory, such as memory 704. Transmission media include coaxial cables, copper wire, and fiber optics, including the wires that comprise bus 708. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used in this specification of this application, the terms "computer-readable storage medium" and "computer-readable media" are entirely restricted to tangible, physical objects that store information in a form that is readable by a computer. These terms exclude any wireless signals, wired download signals, and any other ephemeral signals. Storage media is distinct from but may be used in conjunction with transmission media. Transmission media participates in transferring information between storage media. For example, transmission media includes coaxial cables, copper wire and fiber optics, including the wires that comprise bus 708. Transmission media can also take the form of acoustic or light waves, such as those generated during radio-wave and infra-red data communications. Furthermore, as used in this specification of this application, the terms "computer", "server", "processor", and "memory" all refer to electronic or other technological devices. These terms exclude people or groups of people. For the purposes of the specification, the terms display or displaying means displaying on an electronic device.

In one aspect, a method may be an operation, an instruction, or a function and vice versa. In one aspect, a clause or a claim may be amended to include some or all of the words (e.g., instructions, operations, functions, or components) recited in other one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (e.g., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." Pronouns in the masculine (e.g., his) include the feminine and neuter gender (e.g., her and its) and vice versa. The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for".

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A computer-implemented method for profiling runtime performance of a video gaming application, the method comprising:

receiving indications of values associated with a plurality of identifiers that are associated with a gameplay session of a video gaming application, wherein the plurality of identifiers include one or more system identifiers associated with data at one or more external systems, one or more contextual identifiers associated with context of the video gaming application, and one or more artifact identifiers associated with one or more artifacts that are generated outside of the gameplay session, the one or more system identifiers comprising at least matchmaking identifiers that identify details of the gameplay session, the matchmaking identifiers received by the video gaming application for establishing the gameplay session, the one or more artifacts that are generated outside of the gameplay session comprising one or more screenshots;

in response to capturing screenshots of the video gaming application at a specific time during the gameplay session, associating at least one of the screenshots with a value of an artifact identifier, and embedding the value of the artifact identifier within metadata of the screenshot or visually within the screenshot itself;

determining a mapping of the values associated with the plurality of identifiers, including associating, for each identifier from the plurality of identifiers, each value associated with the respective identifier during a time period of the gameplay session with values associated with a respective one or more other identifiers from the plurality of identifiers during at least a portion of the time period of the gameplay session; and in response to receiving a query that indicates a value associated with an identifier from the plurality of identifiers, providing values associated with one or more identifiers that are associated with the value associated with the identifier based at least in part on the mapping of the values associated with the plurality of identifiers.

2. The method of claim 1, wherein associating, for each identifier from the plurality of identifiers, each value associated with the respective identifier during the time period of the gameplay session with the values associated with a respective one or more other identifiers from the plurality of identifiers during at least the portion of the time period of the gameplay session further comprises:
  associating the respective value associated with the respective identifier during the time period of the gameplay session with two or more different values associated with the same identifier from the plurality of identifiers during at least the portion of the time period of the gameplay session.

3. The method of claim 1, further comprising:
  receiving, from a requesting computing device, an indication of a request to subscribe a second identifier from the plurality of identifiers; and
  in response to receiving the indication of the request to subscribe to the second identifier, sending updated values associated with the second identifier to the requesting computing device as the updated values associated with the second identifier are received from the video gaming application.

4. The method of claim 1, wherein receiving the query that indicates the value associated with an identifier from the plurality of identifiers comprises receiving the screenshot that includes the value associated with the artifact identifier embedded within the screenshot.

5. The computer-implemented method of claim 1, wherein:
  the one or more artifacts that are generated outside of the gameplay session includes telemetry data of the video gaming application during the gameplay session that is generated by a telemetry program; and
  the telemetry data is associated with a telemetry identifier from the one or more artifact identifiers.

6. The computer-implemented method of claim 1, wherein:
  the one or more artifacts that are generated outside of the gameplay session includes a bug report that is generated by a bug tracking application; and
  the bug report is associated with a bug identifier from the one or more artifact identifiers.

7. The computer-implemented method of claim 1, wherein the one or more system identifiers include a matchmaking identifier that is associated with an online gaming session.

8. The computer-implemented method of claim 1, further comprising:
  storing the mapping of the values associated with the plurality of identifiers in a relational database.

9. A system for profiling runtime performance of a video gaming application, the system comprising:
  a memory storing instructions; and
  a processor configured to execute the instructions which, when executed, cause the processor to:
    receive indications of values associated with a plurality of identifiers that are associated with a gameplay session of a video gaming application, wherein the plurality of identifiers include one or more system identifiers associated with data at one or more external systems, one or more contextual identifiers associated with context of the video gaming application, and one or more artifact identifiers associated with one or more artifacts that are generated outside of the gameplay session, the one or more system identifiers comprising at least matchmaking identifiers that identify details of the gameplay session, the matchmaking identifiers received by the video gaming application for establishing the gameplay session, the one or more artifacts that are generated outside of the gameplay session comprising one or more screenshots;
    in response to capturing screenshots of the video gaming application at a specific time during the gameplay session, associate at least one of the screenshots with a value of an artifact identifier, and embed the value of the artifact identifier within metadata of the screenshot or visually within the screenshot itself;
    determine a mapping of the values associated with the plurality of identifiers, including associating, for each identifier from the plurality of identifiers, each value associated with the respective identifier during a time period of the gameplay session with values that are associated with a respective one or more other identifiers from the plurality of identifiers during at least a portion of the time period of the gameplay session;
    store the mapping of the values associated with the plurality of identifiers in the memory; and
    in response to receiving a query that indicates a value associated with an identifier from the plurality of identifiers, provide values associated with one or more identifiers that are associated with the value associated with the identifier based at least in part on the mapping of the values associated with the plurality of identifiers.

10. The system of claim 9, wherein the instructions which, when executed, cause the processor to associate, for each identifier from the plurality of identifiers, each value associated with the respective identifier during the time period of the gameplay session with the values associated with a respective one or more other identifiers from the plurality of identifiers during at least the portion of the time period of the gameplay session further cause the processor to:
  associate the respective value associated with the respective identifier during the time period of the gameplay session with two or more different values associated with the same identifier from the plurality of identifiers during at least the portion of the time period of the gameplay session.

11. The system of claim 9, wherein the instructions which, when executed, further cause the processor to:
  receive, from a requesting computing device, an indication of a request to subscribe a second identifier from the plurality of identifiers; and
  in response to receiving the indication of the request to subscribe to the second identifier, send updated values associated with the second identifier to the requesting computing device as the updated values associated with the second identifier are received from the video gaming application.

12. The system of claim 9, wherein the instructions which, when executed, cause the processor to receive the query that indicates the value associated with an identifier from the plurality of identifiers further cause the processor to receive the screenshot that includes the value associated with the artifact identifier embedded within the screenshot.

13. The system of claim 9, wherein:
  the one or more artifacts that are generated outside of the gameplay session includes telemetry data of the video gaming application during the gameplay session that is generated by a telemetry program; and
  the telemetry data is associated with a telemetry identifier from the one or more artifact identifiers.

14. The system of claim 9, wherein:
the one or more artifacts that are generated outside of the gameplay session includes a bug report that is generated by a bug tracking application; and
the bug report is associated with a bug identifier from the one or more artifact identifiers.

15. The system of claim 9, wherein the one or more system identifiers include a matchmaking identifier that is associated with an online gaming session.

16. The system of claim 9, wherein the instructions which, when executed, cause the processor to store the mapping of the values associated with the plurality of identifiers in the memory further cause the processor to:
store the mapping of the values associated with the plurality of identifiers in a relational database in the memory.

17. A non-transitory machine-readable storage medium comprising machine-readable instructions for causing a processor to execute a method for profiling runtime performance of a video gaming application, comprising:
receiving indications of values associated with a plurality of identifiers that are associated with a gameplay session of a video gaming application, wherein the plurality of identifiers include one or more system identifiers associated with data at one or more external systems, one or more contextual identifiers associated with context of the video gaming application, and one or more artifact identifiers associated with one or more artifacts that are generated outside of the gameplay session, the one or more system identifiers comprising at least matchmaking identifiers that identify details of the gameplay session, the matchmaking identifiers received by the video gaming application for establishing the gameplay session, the one or more artifacts that are generated outside of the gameplay session comprising one or more screenshots;
in response to capturing screenshots of the video gaming application at a specific time during the gameplay session, associating at least one of the screenshots with a value of an artifact identifier, and embedding the value of the artifact identifier within metadata of the screenshot or visually within the screenshot itself;
determining a mapping of the values associated with the plurality of identifiers, including associating, for each identifier from the plurality of identifiers, each value associated with the respective identifier during a time period of the gameplay session with values associated with a respective one or more other identifiers from the plurality of identifiers during at least a portion of the time period of the gameplay session; and
in response to receiving a query that indicates a value associated with an identifier from the plurality of identifiers, providing values associated with one or more identifiers that are associated with the value associated with the identifier based at least in part on the mapping of the values associated with the plurality of identifiers.

18. The non-transitory machine-readable storage medium of claim 17,
wherein associating, for each identifier from the plurality of identifiers, each value associated with the respective identifier during the time period of the gameplay session with the values associated with a respective one or more other identifiers from the plurality of identifiers during at least the portion of the time period of the gameplay session further comprises:
associating the respective value associated with the respective identifier during the time period of the gameplay session with two or more different values associated with the same identifier from the plurality of identifiers during at least the portion of the time period of the gameplay session.

* * * * *

UNITED STATES PATENT AND TRADEMARK OFFICE
CERTIFICATE OF CORRECTION

| | | |
|---|---|---|
| PATENT NO. | : 10,960,315 B1 | |
| APPLICATION NO. | : 16/207488 | |
| DATED | : March 30, 2021 | |
| INVENTOR(S) | : Newman Scott Hunter et al. | |

It is certified that error appears in the above-identified patent and that said Letters Patent is hereby corrected as shown below:

In the Claims

Column 33, Claim Number 3, Line 13-14 should read: --an indication of a request to subscribe to a second identifier from--

Column 34, Claim Number 10, Line 31-38 should read: --when executed, cause the processor to: associate, for each identifier from the plurality of identifiers, each value associated with the respective identifier during the time period of the gameplay session with the values associated with a respective one or more other identifiers from the plurality of identifiers during at least the portion of the time period of the gameplay session; and associate the respective--

Column 34, Claim Number 11, Line 46-47 should read: --an indication of a request to subscribe to a second identifier from--

Column 34, Claim Number 12, Line 56-59 should read: --when executed, cause the processor to: receive the query that indicates the value associated with an identifier from the plurality of identifiers; and receive the screenshot that includes the value associated with the--

Column 35, Claim Number 16, Line 11-14 should read: --when executed, cause the processor to: store the mapping of the values associated with the plurality of identifiers in the memory; and store the mapping--

Signed and Sealed this
Tenth Day of May, 2022

*Katherine Kelly Vidal*

Katherine Kelly Vidal
*Director of the United States Patent and Trademark Office*